(12) United States Patent
Marcotte et al.

(10) Patent No.: US 12,123,626 B2
(45) Date of Patent: Oct. 22, 2024

(54) STRUCTURES AND TECHNIQUES FOR SOLAR COLLECTORS

(71) Applicant: SOLAR DYNAMICS, LLC, Broomfield, CO (US)

(72) Inventors: Patrick David Marcotte, Broomfield, CO (US); Nathaniel Charles Stegall, Broomfield, CO (US)

(73) Assignee: SOLAR DYNAMICS, LLC, Broomfield, CO (US)

( * ) Notice: Subject to any disclaimer, the term of this patent is extended or adjusted under 35 U.S.C. 154(b) by 239 days.

(21) Appl. No.: 17/607,553

(22) PCT Filed: May 8, 2020

(86) PCT No.: PCT/US2020/032117
§ 371 (c)(1),
(2) Date: Oct. 29, 2021

(87) PCT Pub. No.: WO2020/227639
PCT Pub. Date: Nov. 12, 2020

(65) Prior Publication Data
US 2022/0205685 A1    Jun. 30, 2022

Related U.S. Application Data

(60) Provisional application No. 62/845,646, filed on May 9, 2019.

(51) Int. Cl.
*F24S 23/74*        (2018.01)
*F24S 25/13*        (2018.01)
(Continued)

(52) U.S. Cl.
CPC ............... *F24S 23/74* (2018.05); *F24S 25/13* (2018.05); *F24S 25/65* (2018.05); *F24S 30/425* (2018.05); *H02S 20/10* (2014.12); *H02S 20/32* (2014.12)

(58) Field of Classification Search
CPC .......... H02S 20/10; H02S 20/32; F24S 25/13; F24S 25/65; F24S 30/425; F24S 23/74
See application file for complete search history.

(56) References Cited

U.S. PATENT DOCUMENTS

| | | |
|---|---|---|
| 3,998,206 A | 12/1976 | Jahn |
| 4,256,088 A | 3/1981 | Vindum |

(Continued)

FOREIGN PATENT DOCUMENTS

| | | |
|---|---|---|
| CN | 1464934 | 12/2003 |
| CN | 102216697 | 10/2011 |

(Continued)

OTHER PUBLICATIONS

Marcotte et al. "Development of an advanced large-aperture parabolic trough collector," Energy Procedia, 2014, vol. 49, pp. 145-154.

(Continued)

*Primary Examiner* — Lindsey A Buck
(74) *Attorney, Agent, or Firm* — Sheridan Ross P.C.

(57) ABSTRACT

Structures and techniques for solar collectors are described. In accordance with the described techniques, a structural assembly of a solar collector may include various members that are configured to carry torsional and bending loads with relatively low deflections between a reflector and a receiver. In some examples, the described structural assemblies may include a set of edge-sharing tetrahedra or tetrahedral volumes aligned along an axis, which may be supported by chord members that are parallel to the axis. In some examples, the described structural assemblies may include sets of co-rotating and counter-rotating helical structural paths, which may be connected or supported by structural members that are perpendicular to an axis of the helical (Continued)

structural paths, or members that are parallel to an axis of the helical structural paths, or various combinations thereof.

18 Claims, 22 Drawing Sheets

(51) Int. Cl.
  *F24S 25/65*    (2018.01)
  *F24S 30/425*   (2018.01)
  *H02S 20/10*    (2014.01)
  *H02S 20/32*    (2014.01)

(56) References Cited

U.S. PATENT DOCUMENTS

| | | | |
|---|---|---|---|
| 5,701,713 A * | 12/1997 | Silver | E04C 3/11 |
| | | | 52/645 |
| 9,057,543 B2 | 6/2015 | Marcotte et al. | |
| 2010/0050560 A1 | 3/2010 | Werner et al. | |
| 2010/0252030 A1 * | 10/2010 | Marcotte | F24S 40/80 |
| | | | 126/694 |
| 2011/0108090 A1 | 5/2011 | Lance et al. | |
| 2011/0319179 A1 | 12/2011 | Howard | |
| 2014/0020677 A1 | 1/2014 | Abascal et al. | |
| 2014/0144428 A1 | 5/2014 | Eisinger et al. | |
| 2014/0347758 A1 | 11/2014 | Werner et al. | |
| 2015/0022915 A1 | 1/2015 | Wang et al. | |
| 2015/0124344 A1 | 5/2015 | Clark et al. | |
| 2020/0091863 A1 | 3/2020 | Angel et al. | |
| 2023/0184464 A1 | 6/2023 | Stegall et al. | |

FOREIGN PATENT DOCUMENTS

| | | |
|---|---|---|
| CN | 102439379 | 5/2012 |
| CN | 103403471 | 11/2013 |
| CN | 103620318 | 3/2014 |
| CN | 103940129 | 7/2014 |
| CN | 108981203 | 12/2018 |
| CN | 109237818 | 1/2019 |
| EP | 0422875 | 4/1991 |
| ES | 1064577 | 4/2007 |
| ES | 2343825 | 8/2010 |
| WO | WO 2007/109901 | 10/2007 |
| WO | WO 2008/039233 | 4/2008 |
| WO | WO 2012/052579 | 4/2012 |
| WO | WO 2015/009507 | 1/2015 |
| WO | WO 2019/147149 | 8/2019 |

OTHER PUBLICATIONS

Official Action with English Translation for China Patent Application No. 202080049255.0, dated May 4, 2023 12 pages.
Notice of Allowance with English Translation for China Patent Application No. 202080049255.0, dated Nov. 29, 2023 7 pages.
International Search Report and Written Opinion prepared by the U.S. Patent and Trademark Office for International (PCT) Patent Application No. PCT/US2020/032117, dated Jul. 20, 2020, 8 pages.
Notice of Acceptance for Australia Patent Application No. 2020267680, dated Sep. 2, 2022 4 pages.
International Preliminary Report on Patentability for International (PCT) Patent Application No. PCT/US2020/032117, dated Nov. 18, 2021 8 pages.

* cited by examiner

STRUCTURES AND TECHNIQUES FOR SOLAR COLLECTORS

CROSS REFERENCE TO RELATED APPLICATIONS

This application is a national stage application under 35 U.S.C. 371 and claims the benefit of PCT Application No. PCT/US2020/032117 having an international filing date of May 8, 2020, which designated the United States, which PCT application claimed priority, under 35 U.S.C. § 119 (e), to U.S. Provisional Patent Application No. 62/845,646 by Marcotte et al. entitled "STRUCTURES AND TECHNIQUES FOR SOLAR COLLECTORS," filed May 9, 2019, which is assigned to the assignee hereof, the entire disclosures of each of which are incorporated herein by reference.

BACKGROUND

The following relates generally to solar energy collection and more specifically to structures and related techniques for solar collectors.

Solar energy collectors, such as concentrated solar power (CSP) systems, may include a reflector assembly that reflects incident solar energy onto a receiver assembly. The receiver assembly may include various components configured to collect the reflected solar energy as heat energy in a heat transfer medium (e.g., a working fluid) such as oil, salt or salt solution, and others. Heat energy may accordingly be conveyed through the receiver assembly and used in various subsequent power conversion or power transfer processes to utilize the captured energy.

The ability of a solar energy collector to convert incident solar energy into usable heat energy may be related to the optical efficiency or precision of the system, which may include the accuracy in which the reflector assembly focuses incident solar energy onto the receiver assembly. In some examples, such accuracy may be related to the structural rigidity of the reflector assembly, the receiver assembly, and various structures therebetween. In some examples, varying load conditions experienced by a solar energy collector may cause deflections that impair the optical efficiency of a solar energy collector.

SUMMARY

A solar collector assembly in accordance with the present disclosure may include structural members and subassemblies arranged in particular configurations that balance considerations of structural rigidity and costs. In some examples, the described solar collector assemblies may include structures that form (e.g., according to one or more edge-defining structural members), or are otherwise associated with (e.g., according to one or more vertex-defining structural nodes) edge-sharing tetrahedral shapes or volumes that are arranged along a longitudinal axis of the solar collector assembly. In various examples, the tetrahedral shapes or volumes may be symmetric with respect to the longitudinal axis, such as reflective symmetry across a radial direction of the solar collector assembly, across a transverse direction of the assembly, or both.

The described arrangements of tetrahedral shapes or volumes may illustrate examples for forming sets of co-rotating or counter-rotating helical structural paths from one end of a solar collector assembly to the other (e.g., along a longitudinal axis), which may support torsional stiffness or rigidity (e.g., about the longitudinal axis) of the solar collector assembly, including torsional stiffness of a structure or space frame of the solar collector assembly, and torsional stiffness between a reflector assembly and a receiver assembly. In various examples, the described helical structural paths may be coupled or connected to each other by additional members, such as central axial members (e.g., structural members perpendicular to the longitudinal axis, structural members crossing the longitudinal axis), longitudinal members (e.g., structural members parallel to the longitudinal axis, peripheral members), and others, which may support bending stiffness or rigidity (e.g., about one or more axes perpendicular to the longitudinal axis), buckling resistance, and other structural characteristics for the solar collector assembly. These aspects of a structural assembly may further include particular mounting positions for other components or structures, such as reflector assembly supports and receiver assembly supports, to provide various functions such as supporting a receiver assembly relative to a reflector assembly with a relatively stiff, efficient structure.

BRIEF DESCRIPTION OF THE DRAWINGS

A further understanding of the nature and advantages of various aspects of the present disclosure may be realized by reference to the following drawings. In the appended figures, similar components or features may have the same reference numeral. Further, various components of the same type may be distinguished (e.g., by instance of components, by characteristics of components) by following the reference numeral by a dash and additional labels that distinguish among the components. For example, if only the first reference numeral is used in the specification, the description is applicable to any one of the similar components having the same first reference numeral irrespective of additional reference labels.

DETAILED DESCRIPTION

Figure 1:
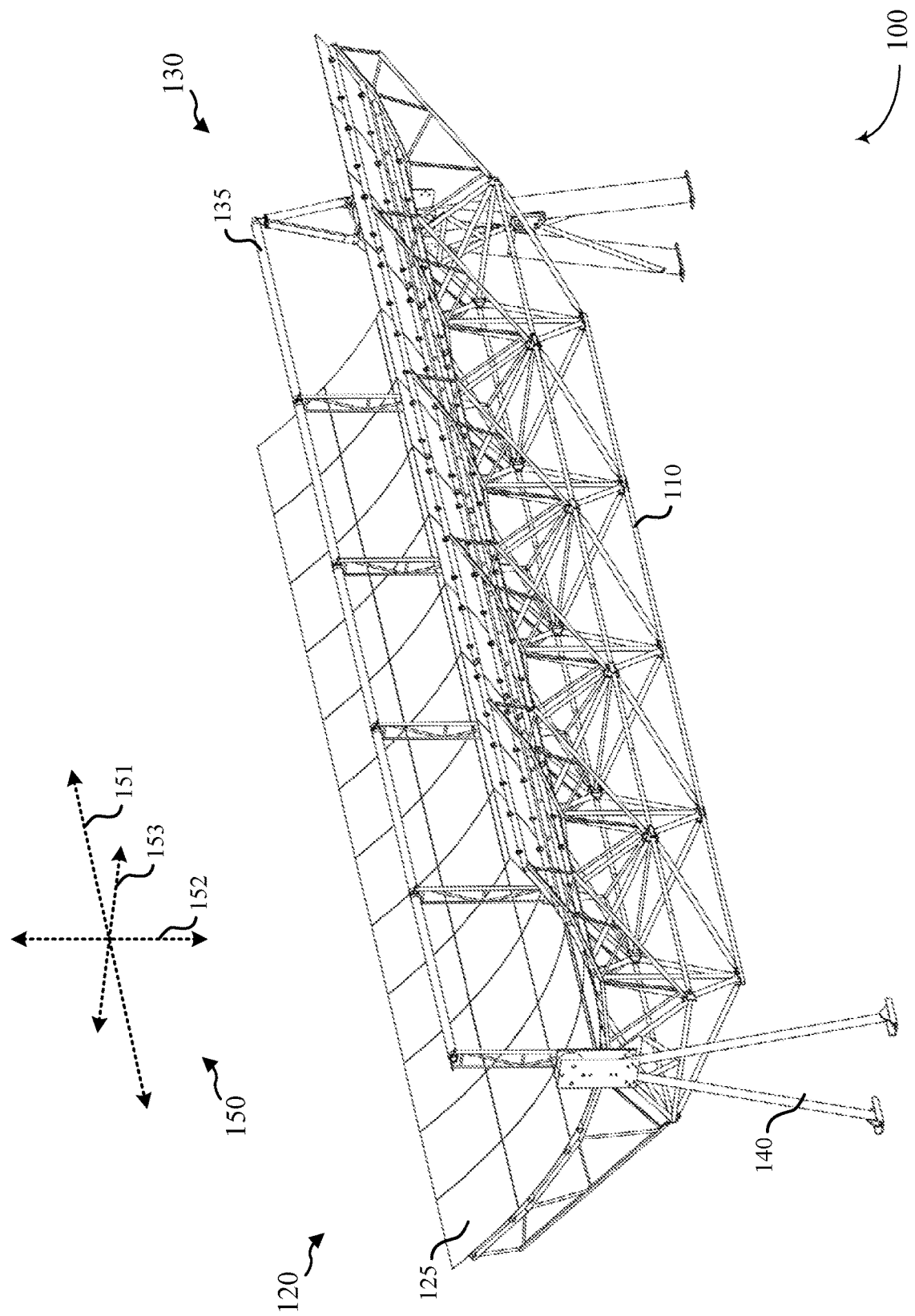
FIG. 1 illustrates an example of a solar collector assembly in accordance with aspects of the present disclosure.

Structures and related techniques for solar collectors are described. In some examples, solar collector assemblies may be subject to various load conditions, such as gravitational loads, wind loads, thermal loads (e.g., related to thermal expansion or contraction), actuation loads, and others. Loads such as these may be conveyed through structures of a solar collector assembly as normal loads, shear loads, torsional loads, and bending loads, and may be accompanied by corresponding stresses and strains. In some examples, such load conditions may vary based on ambient conditions, static or dynamic operations, component orientations (e.g., pointing directions), and other factors.

Because the ability of a solar collector to convert incident solar energy into usable thermal energy can be based at least in part on optical efficiency or precision, a solar collector may benefit from structures that limit deflections in response to such varying load conditions, and corresponding structural loads or stresses. In other words, solar collector assemblies may benefit from including relatively stiff or rigid structural assemblies or supports between reflecting elements and receiving elements, and structural assemblies or supports between such elements and a mounting location. As an illustrative example, the energy conversion efficiency of some solar collector assemblies may be sensitive to deflections in the range of single digit milliradians. However, implementation of solar collector assemblies, such as utility-scale power plants, may also be sensitive to various costs, such as component costs, material costs, installation costs, and others, which may be accompanied by practical limitations on how rigid a structure can be while remaining financially viable in a utility-scale power plant application.

In accordance with the described techniques, a solar collector assembly may include structural members and subassemblies arranged in particular configurations that balance competing considerations of structural rigidity and costs. In some examples, the described solar collector assemblies may include structures that form (e.g., according to one or more edge-defining structural members), or are otherwise associated with (e.g., according to one or more vertex-defining structural nodes) edge-sharing tetrahedral shapes or volumes that are arranged along a longitudinal axis of the solar collector assembly. In various examples, the tetrahedral shapes or volumes may be symmetric with respect to the longitudinal axis, such as reflective symmetry across a radial direction of the solar collector assembly, across a transverse direction of the assembly, or both.

The described arrangements of tetrahedral shapes or volumes may illustrate examples for forming sets of co-rotating or counter-rotating helical structural paths from one end of the solar collector assembly to the other (e.g., along a longitudinal axis), which may support torsional stiffness or rigidity (e.g., about the longitudinal axis) of the solar collector assembly, including torsional stiffness of a structure or space frame of the solar collector assembly, and torsional stiffness between a reflector assembly and a receiver assembly. In various examples, the described helical structural paths may be coupled or connected to each other by additional members, such as central axial members (e.g., structural members perpendicular to the longitudinal axis, structural members crossing the longitudinal axis), longitudinal members (e.g., structural members parallel to the longitudinal axis, peripheral members), and others, which may support bending stiffness or rigidity (e.g., about one or more axes perpendicular to the longitudinal axis), buckling resistance, and other structural characteristics for the solar collector assembly. These aspects of a structural assembly may further include particular mounting positions for other components or structures, such as reflector assembly supports and receiver assembly supports, to provide various functions such as supporting a receiver assembly relative to a reflector assembly with a relatively stiff, efficient structure.

This description provides examples of structures for solar collector assemblies, and is not intended to limit the scope, applicability, or configuration of embodiments of the principles described herein. Rather, the ensuing description will provide those skilled in the art with an enabling description for implementing embodiments of the techniques described herein. Various changes may be made in the function, arrangement, or repetition of components, and embodiments may omit, substitute, or add various operations or components as appropriate. For instance, aspects and elements described with respect to some embodiments may be combined or repeated in various other embodiments (e.g., according to different repetition of elements or sets of elements or structures that are repeated along a longitudinal direction). It should also be appreciated that the following systems, methods, and devices may individually or collectively be components of a larger system.

FIG. 1 illustrates an example of a solar collector assembly 100 in accordance with aspects of the present disclosure. The solar collector assembly 100 includes a structural assembly 110 (e.g., a space frame), to which a reflector assembly 120 and a receiver assembly 130 may be coupled or connected. Thus, the structural assembly 110 may provide support of or between components of the reflector assembly 120 or the receiver assembly 130. The solar collector assembly 100 may also include a pedestal assembly 140 that supports fixing the solar collector assembly 100 to the ground or other mounting platform.

The reflector assembly 120 may include various components configured to reflect incident solar energy onto the receiver assembly 130. For example, the reflector assembly 120 may include a plurality of mirror segments 125, which may include various types of mirrors or other reflecting or focusing component (e.g., lenses). In some examples, the reflector assembly 120 may have a parabolic trough configuration, and the receiver assembly 130 may be located at a focal point or focal axis of the parabolic trough.

The receiver assembly 130 may include various components to collect or otherwise receive solar energy, including both directly incident solar energy and solar energy incident on the reflector assembly 120 that is reflected to the receiver assembly 130. The receiver assembly 130 may include a plurality of receiver segments 135, which may include various types of pipes, tubes, or other types of component for conveying a heat transfer medium (e.g., a heat transfer fluid). For example, each of the receiver segments 135 may include a pipe that is configured to convey oil, salt or salt solution, or other medium, which may be provided to an energy conversion component (not shown), such as a steam generation component, or a heat engine (e.g., a Stirling engine), which may support converting conveyed thermal energy into, for example, electrical power. In other examples, thermal energy of a heated fluid may be used more directly, such as for providing hot water for domestic or commercial purposes. The fluid may be recirculated through a collector array, such as a recirculation after heat energy is extracted from the fluid.

The structural assembly 110 may be rotatably coupled with the pedestal assembly 140, such that the solar collector assembly 100 supports pointing or otherwise aligning one or both of the reflector assembly 120 and the receiver assembly 130 to maximize solar energy capture. For example, the structural assembly 110, the reflector assembly 120, or the receiver assembly 130, or any combination thereof, may be described with reference to a longitudinal direction 151, a radial direction 152, and a transverse direction 153, as shown by the coordinate system 150. The reflector assembly 120 and the receiver assembly 130 may be generally aligned along the longitudinal direction 151 as shown, and the solar collector assembly 100 may be configured for maximum solar energy capture when the radial direction 152 is aligned with or according to a direction of incident solar energy (e.g., such that, when viewed along the longitudinal direction 151, the radial direction 152 is parallel to the incident solar energy). In other words, the solar collector assembly 100 may be configured for maximum energy capture when the radial direction 152 (e.g., of the structural assembly 110, the reflector assembly 120, or the receiver assembly 130, or various combinations thereof) is pointed, about the longitudinal direction 151, in the direction of the sun (e.g., by a rotating actuator coupled between the structural assembly 110 and the pedestal assembly 140 about an actuation axis that is parallel to the longitudinal direction 151).

To support energy capture of the solar collector assembly 100, it may be beneficial to maintain the shape of the reflector assembly 120, the shape of the receiver assembly 130, the relative alignment between the reflector assembly 120 and the receiver assembly 130, or combinations thereof. Accordingly, it may be beneficial that the structural assembly 110, or the solar collector assembly 100 as a whole, be able to handle varying load conditions with relatively little deflection. For example, it may be beneficial that the structural assembly 110 be relatively rigid to different combinations of load conditions, including combinations of torsional loads (e.g., torque about the longitudinal direction 151), bending loads (e.g., bending about the radial direction 152, bending about the transverse direction 153, bending due to point or distributed loads having a component in a direction perpendicular to the longitudinal axis), and others.

In accordance with the described structures and techniques, a solar collector assembly 100 may include a structural assembly 110 that is designed to support or react various combinations of load conditions experienced by the solar collector assembly 100, balancing considerations such as limiting structural deflections while also limiting costs associated with part quantity, part configurations, material cost, and complexity. Examples of solar collector assemblies 100 and structural assemblies 110 thereof in accordance with the present disclosure are described in further detail with reference to FIGS. 2 through 16, some of which illustrate partial sets of components, and some of which are illustrated in a stepwise manner building on components described and identified by reference numeral in a prior figure. The provided illustrations are not meant to convey a particular order in which constituent components are assembled, or a particular importance of one type of component relative to another. Rather, the partial or stepwise illustrations provided herein are meant to support the description of examples of various constituent components, or combinations of components, and how such components may be included in or otherwise contribute to a structural assembly 110, a solar collector assembly 100, or a set of interconnected solar collector assemblies 100.

Figure 2:
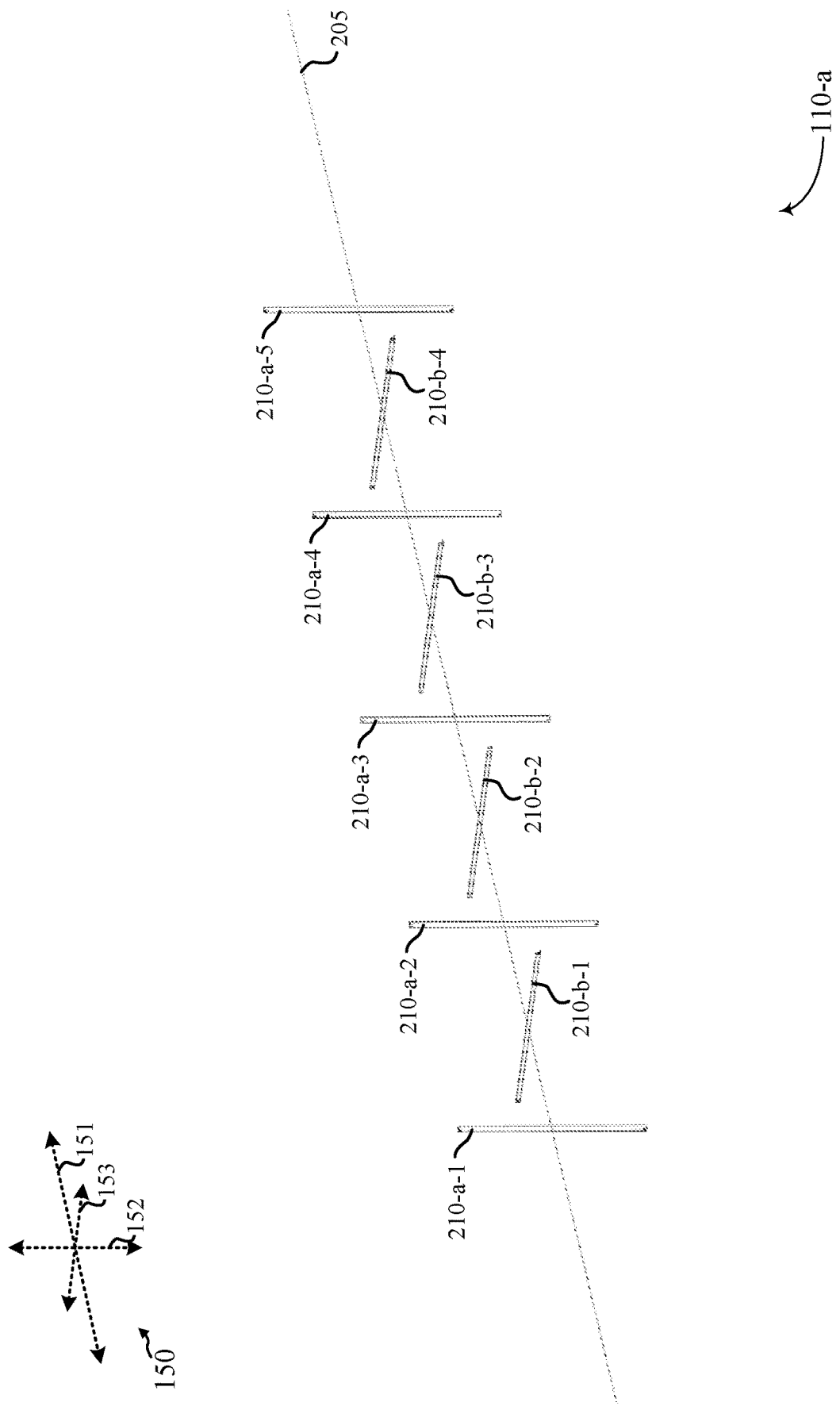
FIG. 2 illustrates an example of axial members that may be included in a solar collector assembly in accordance with aspects of the present disclosure.

FIG. 2 illustrates an example of axial members 210 that may be included in a solar collector assembly 100 (e.g., in a structural assembly 110-a) in accordance with aspects of the present disclosure. In some examples, the axial members 210 may be predominantly or substantially linear structural members, and may be described as having a direction or axis between opposed ends (e.g., mounting or coupling locations). The structural assembly 110-a may be described with reference to an axis 205, which may be referred to as a longitudinal axis, or an axis that is parallel to a longitudinal direction 151 of the structural assembly 110-a or associated solar collector assembly 100.

The structural assembly 110-a includes a set of axial members 210 (e.g., central axial members), which may be spaced apart along the axis 205. For example, the structural assembly 110-a may include a set of radial members 210-a (e.g., aligned along a radial direction 152, configured to be aligned toward or according to a direction of solar radiation during operation when viewed along the longitudinal direction 151) and a set of lateral members 210-b (e.g., aligned along a transverse direction 153, configured to be aligned perpendicular to a direction of solar radiation during operation when viewed along the longitudinal direction 151). In some examples, each of the axial members 210 may be coincident with the axis 205. In other words, each of the axial members 210 may be disposed on a common axis (e.g., a common longitudinal axis, the axis 205), which may define the longitudinal axis of the structural frame (e.g., of the structural assembly 110-a). In some examples, each of the axial members 210 may be perpendicular to the axis 205. Although the axial members 210 of the structural assembly 110-a are illustrated as being evenly spaced along the axis 205, in other examples (not shown), axial members may be non-uniformly spaced along an axis 205.

In some examples (e.g., as shown), each of the axial members 210 may share a common length. In other words, each of the radial members 210-a may have the same length as each of the lateral members 210-b. In other examples, the radial members 210-a may have a first length, and the lateral members 210-b may have a second length that is different than the first length. Although each of the radial members 210-a are shown as having a common length, and each of the lateral members 210-b are shown as having a common length, in other examples, a solar collector assembly may have axial members 210 having different lengths (e.g., between radial members 210-a and lateral members 210-b, from one axial member 210 to another along the longitudinal direction 151), which may provide advantages with respect to stress or deflections at particular locations of the structural assembly 110-a, or in particular directions of the structural assembly 110-a.

In various examples, the axial members 210 may be configured to be coincident with the axis 205 at a midpoint of a respective axial member 210, or at some other position along a respective axial member. When each of the axial members 210 are configured to be coincident with the axis 205 at a midpoint of the respective axial member 210, aspects of the structural assembly 110-a may be symmetric along a radial direction 152 (e.g., reflective across a plane coincident with the axis 205 and parallel to a transverse direction 153) and symmetric along a transverse direction (e.g., reflective across a plane coincident with the axis 205 and parallel to a radial direction 152). When lateral members 210-*b* are configured to be coincident with the axis 205 at a midpoint of the respective lateral member 210-*b* and radial members 210-*a* are configured to be coincident with the axis 205 at a point that is different than the midpoint of the respective radial member 210-*a* (not shown), aspects of the structural assembly 110-*a* may be symmetric along a transverse direction, but not symmetric along a radial direction 152. For example, aspects of such a structural assembly 110 may be kite-shaped (e.g., when viewed along the longitudinal direction 151), where one or more of the lateral members 210-*b* may be skewed closer to or farther from a receiver assembly 130 than when the axis 205 is coincident with midpoints of the radial members 210-*a*.

FIGS. 3A through 3D illustrate an example of diagonal members 310 that may be included in a solar collector assembly 100 (e.g., in the structural assembly 110-*a*) in accordance with aspects of the present disclosure. In some examples, the diagonal members 310 may be predominantly or substantially linear structural members, and may be described as having a direction or axis between opposed ends (e.g., mounting or coupling locations). For example, the structural assembly 110-*a* may include a set of upper diagonal members 310-*a* (e.g., generally disposed between the axis 205 and a reflector assembly 120 or a receiver assembly 130) and a set of lower diagonal members 310-*b* (e.g., generally disposed opposite the axis 205 from a reflector assembly 120 or a receiver assembly 130). Examples of upper diagonal members 310-*a*-1 through 310-*a*-8 and lower diagonal members 310-*b*-1 through 310-*b*-8 are identified by reference numeral in FIG. 3A for the structural assembly 110-*a*, and other diagonal members 310 that are not specifically identified by reference numeral may share characteristics of those diagonal members 310 that are specifically identified.

The diagonal members 310 may be disposed in a manner that couples or connects adjacent axial members 210. For example, upper diagonal members 310-*a*-3 and 310-*a*-4 may be coupled between a top end of the radial member 210-*a*-1 and respective ends of the lateral member 210-*b*-1, and lower diagonal members 310-*b*-3 and 310-*b*-4 may be coupled between a bottom end of the lateral member 210-*b*-1. Thus, the diagonal frame members may join ends of adjacent axial members 210 such that tetrahedral shapes or volumes are created by the combination of axial members 210 and diagonal members 310. For example, the radial member 210-*a*-1, the lateral member 210-*b*-1, the upper diagonal members 310-*a*-3 and 310-*a*-4, and the lower diagonal members 310-*b*-3 and 310-*b*-4 may enclose or be otherwise associated with a tetrahedral volume, identified as tetrahedron 370-*a*-1 in FIG. 3C. Other tetrahedral volumes may be formed between axial members 210 and diagonal members 310, such as tetrahedra 370-*a*-2 through 370-*a*-8 identified in FIG. 3C.

In the example of structural assembly 110-*a*, the principal direction or axis of each of the diagonal members 310 may be associated with a vector component in each of the longitudinal direction 151, the radial direction 152, and the transverse direction 153. Thus, the diagonal members 310 may be neither parallel to nor perpendicular to the longitudinal direction 151 (e.g., axis 205), neither parallel to or perpendicular to the radial direction 152, and neither parallel to or perpendicular to the transverse direction 153, and so on.

In some examples, each of the diagonal members 310 may have a common length, a common configuration (e.g., mounting connection, termination configuration), or both, which may reduce a quantity of unique parts in the structural assembly 110-*a*, or reduce assembly complexity associated with the structural assembly 110-*a*. However, in other examples, diagonal members 310 may have lengths or other configurations that are different from another. For example, when the axis 205 is not coincident with the mid-point of radial members 210-*a* (not shown), the upper diagonal members 310-*a* may have a different length than the lower diagonal members 310-*b*.

Figure 3A:
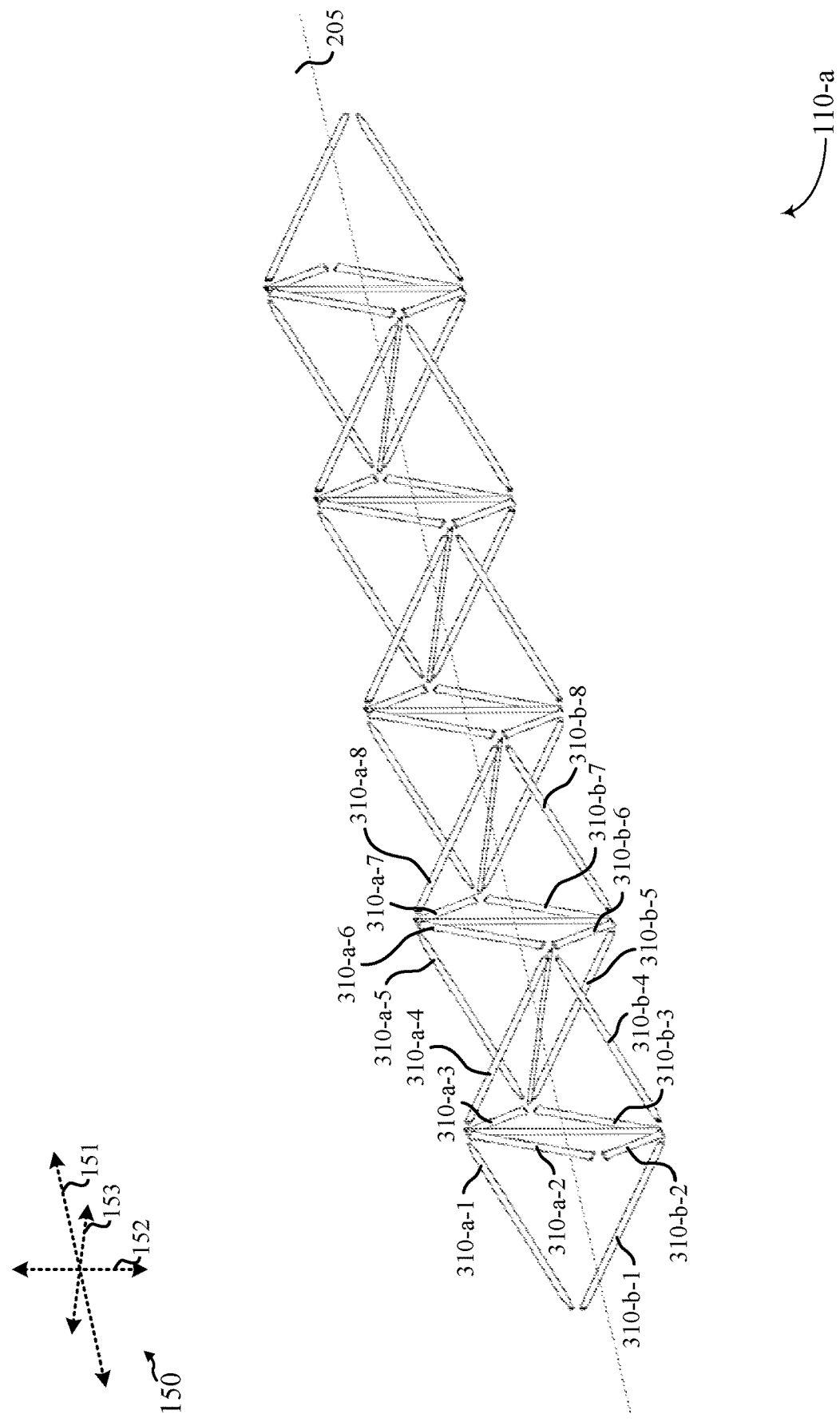
FIGS. 3A through 3D illustrate an example of diagonal members that may be included in a solar collector assembly in accordance with aspects of the present disclosure.
Figure 3B:
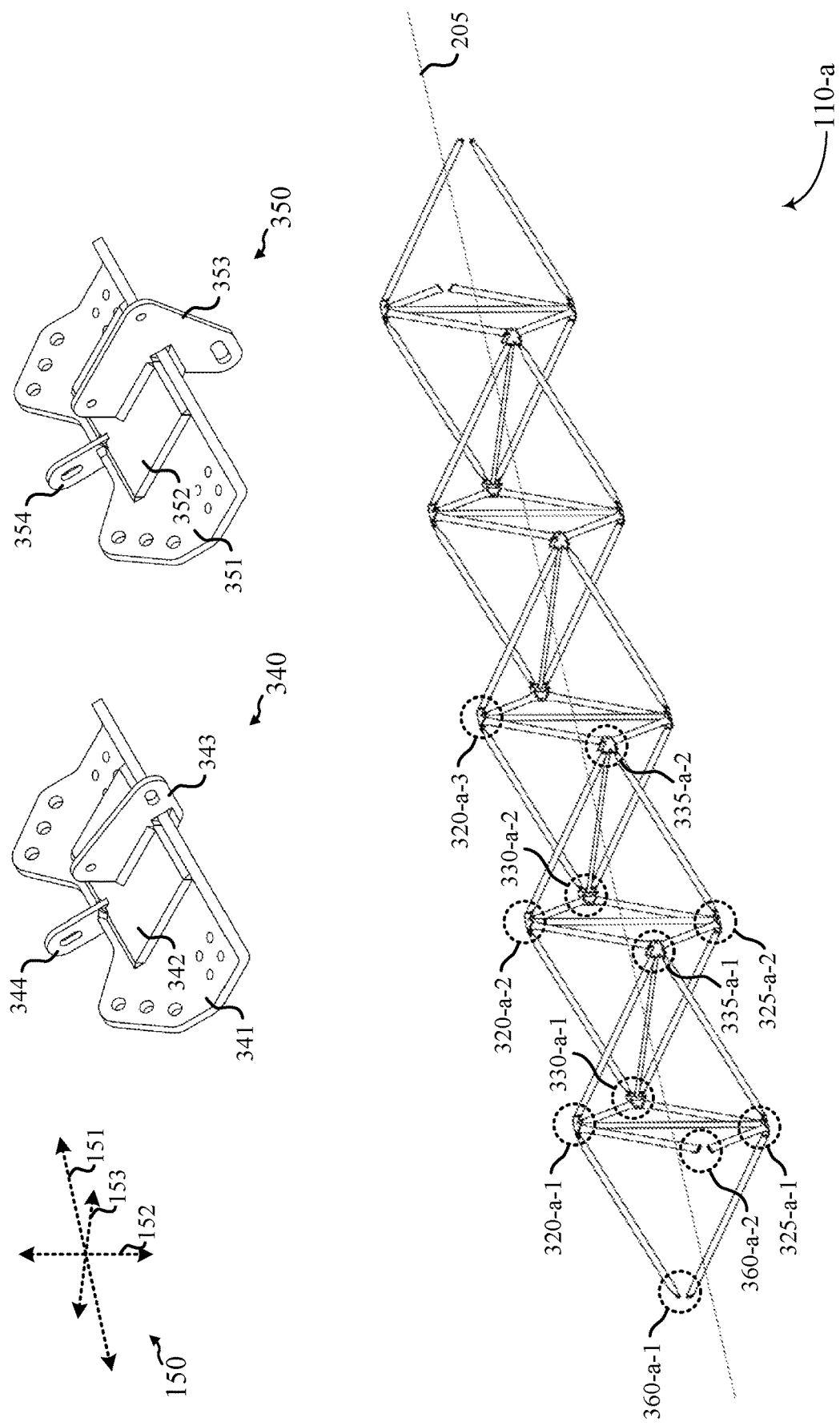
Figure 3C:
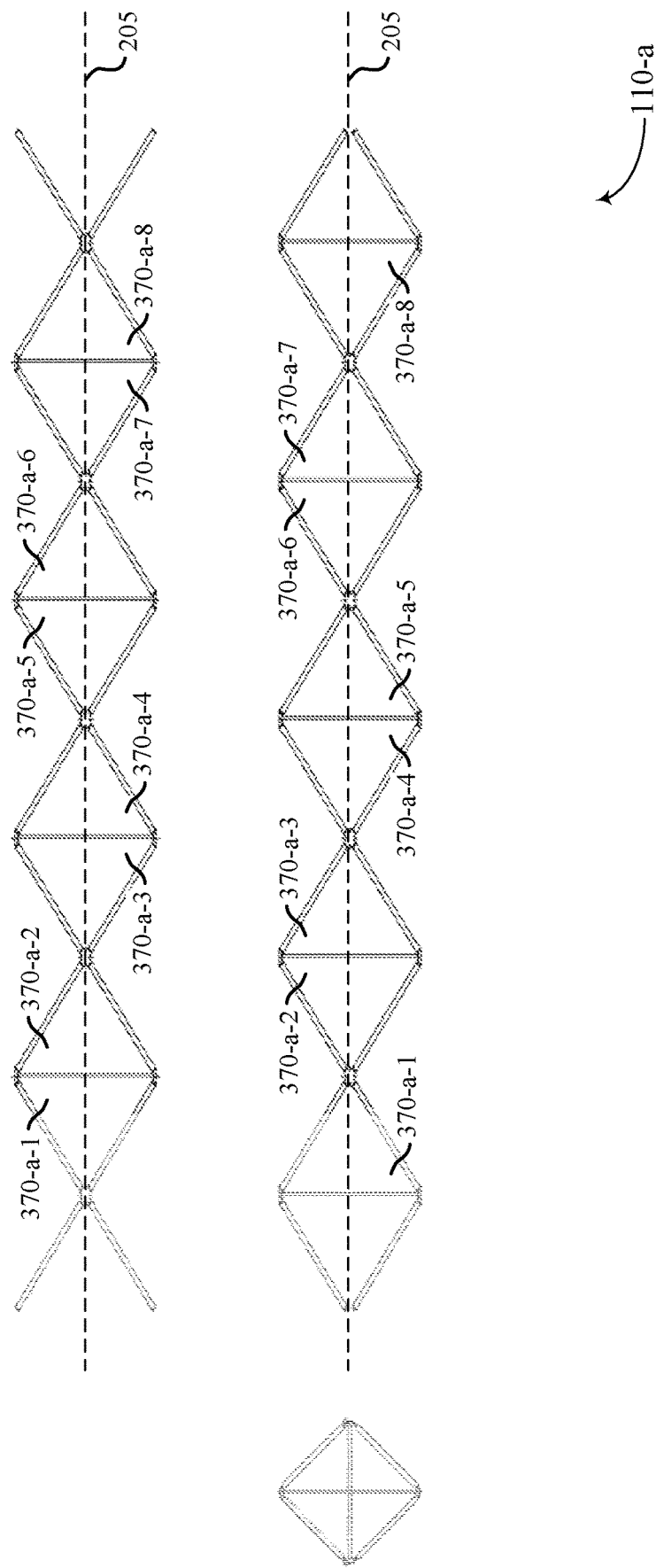

In some examples, the connections between axial members 210 and diagonal members 310 may be described in the context of nodes or node connections, such as those identified in FIG. 3B. For example, the structural assembly 110-*a* may include top nodes 320 generally associated with a first end (e.g., an upper end) of radial members 210-*a*, bottom nodes 325 generally associated with a second end (e.g., a lower end) of radial members 210-*a*, left nodes 330 generally associated with a first end of lateral members 210-*b*, and right nodes 335 generally associated with a second end of lateral members 210-*b*. The structural assembly 110-*a* may accordingly include or otherwise be associated with tetrahedral volumes that are described with reference to the top nodes 320, bottom nodes 325, left nodes 330, and right nodes 335. For example, the previously-described tetrahedron 370-*a*-1 may refer to a volume defined by corners or vertices at the top node 320-*a*-1, the bottom node 325-*a*-1, the left node 330-*a*-1, and the right node 335-*a*-1.

In accordance with examples of the present disclosure, the structural assembly 110-*a* may include a set of tetrahedral structure or volumes that share alternating edgewise connections. For example, tetrahedron 370-*a*-1 and tetrahedron 370-*a*-2 may share an edge at the lateral member 210-*b*-1, or between the left node 330-*a*-1 and the right node 335-*a*-1. Further, tetrahedron 370-*a*-2 and tetrahedron 370-*a*-3 may share an edge at the radial member 210-*a*-2, or between the top node 320-*a*-2 and the bottom node 325-*a*-2. In some examples, adjacent tetrahedral shapes may share a common edge or axis defined by a shared axial member 210, which may include common edges that alternate between radial members 210-*a* and lateral members 210-*b* along the axis 205. In other words, the structural assembly 110-*a* may include or otherwise be associated with edgewise coupled tetrahedra or tetrahedral volumes, where the direction of edgewise coupling alternates or otherwise changes from one coupling to the next.

Thus, the structural assembly 110-*a* may include or otherwise be associated with space frame structures defined by a repetition of tetrahedrally arranged struts (e.g., struts having a tubular cross section, struts having an angular cross section) and node connectors, which may support resisting loads (e.g., torque loads) with a relatively small quantity of parts and materials. In such a frame, tetrahedral sets of members may be laid out orthogonally along the length of a central frame axis (e.g., along the axis 205) to form a torque-resisting structure with a relatively large cross-sectional area.

In the example of structural assembly 110-*a*, each of the top nodes 320, bottom nodes 325, left nodes 330, and right nodes 335 may be associated with respective node connectors (e.g., hub connectors) configured to provide a connection point for structural members of the structural assembly 110-*a*. In some examples, such connectors may be associated with ends of axial members 210, and diagonal members 310 may be joined to the axial member 210 by a common interconnection to the node connector. For example, one or both of top nodes 320 or bottom nodes 325 may be associated with a radial node connector 340 that provides a connection point for one or more of an associated radial member 210-*a* and diagonal members 310. In various examples, radial node connectors 340 may have a same configuration for a top node 320 and a bottom node 325, or radial node connectors 340 may have a different configuration for a top node 320 and a bottom node 325. Further, one or both of left nodes 330 or right nodes 335 may be associated with a lateral node connector 350 that provides a connection point for one or more of an associated lateral member 210-*b* and diagonal members 310. In various examples, lateral node connectors 350 may have a same configuration for a left node 330 and a right node 335, or lateral node connectors 350 may have a different configuration for a left node 330 and a right node 335. In some examples, lateral node connectors 350 may be further configured for connections associated with a reflector assembly 120 (e.g., mirror support arms, a reflector support interconnection assembly), or a receiver assembly 130 (e.g., a receiver support base, a receiver support interconnection assembly), or a combination thereof, including examples of such components described herein. Thus, in accordance with some examples, lateral node connectors 350 may be configured as hub or node connectors on opposite sides of a longitudinal axis (e.g., the axis 205) that are configured for interconnections between a structural assembly 110 and one or both of a reflector assembly 120 or a receiver assembly 130, which may support a relatively stiff torsional interconnection or support between a reflector assembly 120 and a receiver assembly 130.

The radial node connectors 340 and the lateral node connectors 350 may be formed by various materials and processes, and may take the form of a folded plate, a welded plate, a casting, a forging, and others. For example, radial node connectors 340 may each include a first plate 341 that is folded along two fold lines that are parallel with the axis 205, and a second plate 342 that is welded to the first plate 341 along two weld lines, forming a trapezoidal box section or cross section when viewed along a direction parallel to the axis 205 (e.g., according to radial node connector 340-*a*-1 as viewed in FIG. 6C). In some examples, the radial node connectors may each include a first tab 343, welded to one or both of the first plate 341 or the second plate 342, and configured to provide a connection point for a respective radial member 210-*a* and a respective first chord brace (e.g., a first chord brace 710-*b* described with reference to FIG. 7). In some examples, the radial node connectors 340 may each include a second tab 344, welded to one or both of the first plate 341 or the second plate 342 and discontinuous with a first tab 343 (e.g., separately formed, welded), and configured to provide a connection point for a respective second chord brace (e.g., a first chord brace 710-*b* described with reference to FIG. 7). In some examples, connection points for chord braces may be omitted from a radial node connector 340, which may include omitting a second tab 344.

Likewise, lateral node connectors 350 may each include a first plate 351 that is folded along two fold lines that are parallel with the axis 205, and a second plate 352 that is welded to the first plate 351 along two weld lines, forming a trapezoidal box section or cross section when viewed along a direction parallel to the axis 205. In some examples, the lateral node connectors may each include a first tab 353, welded to one or both of the first plate 351 or the second plate 352, and configured to provide a connection point for a respective lateral member 210-*b*, a respective receiver support base (e.g., a receiver support base 410-*a* as described with reference to FIG. 4), and a respective mirror arm (e.g., a mirror arm 910 as described with reference to FIG. 9). In some examples, the lateral node connectors 350 may each include a second tab 354, welded to one or both of the first plate 351 or the second plate 352 and discontinuous with a first tab 353 (e.g., separately formed, welded), and configured to provide a connection point for a respective chord brace (e.g., a chord brace 710-*a* described with reference to FIG. 7). In some examples, connection points for chord braces may be omitted from a lateral node connector 350, which may include omitting a second tab 354.

The structural assembly 110-*a* may also be associated with end nodes 360, which may also be associated with tetrahedral volumes or structures (e.g., of the structural assembly 110-*a*). For example, another tetrahedron may be associated with the top node 320-*a*-1, the bottom node 325-*a*-1, and the end nodes 360-*a*-1 and 360-*a*-2. In some examples, such a tetrahedron may be equal to, or symmetric with other tetrahedra 370-*a*, such as when diagonal members 310-*a*-1 and 310-*a*-2 have a same length as diagonal members 310-*a*-3 and 310-*a*-4, and diagonal members 310-*b*-1 and 310-*b*-2 have a same length as diagonal members 310-*b*-3 and 310-*b*-4. However, in other examples, various tetrahedra of a solar collector assembly 100 may or may not be equal or symmetric. In various examples, end nodes 360 may be configured for connections associated with an end of the structural assembly 110-*a*, such as connections with an end truss, a pedestal assembly 140, an adjacent structural assembly 110 (not shown), and others. For example, the end nodes 360 may be configured to support or distribute torsional loads between an end of the structural assembly 110-*a* and an adjacent structural assembly 110 (e.g., of an adjacent solar collector assembly 100, not shown), or an actuator configured to position or hold an alignment of the structural assembly 110-*a* (e.g., for aligning the radial direction 152 according to a direction of incident solar radiation).

Figure 3D:
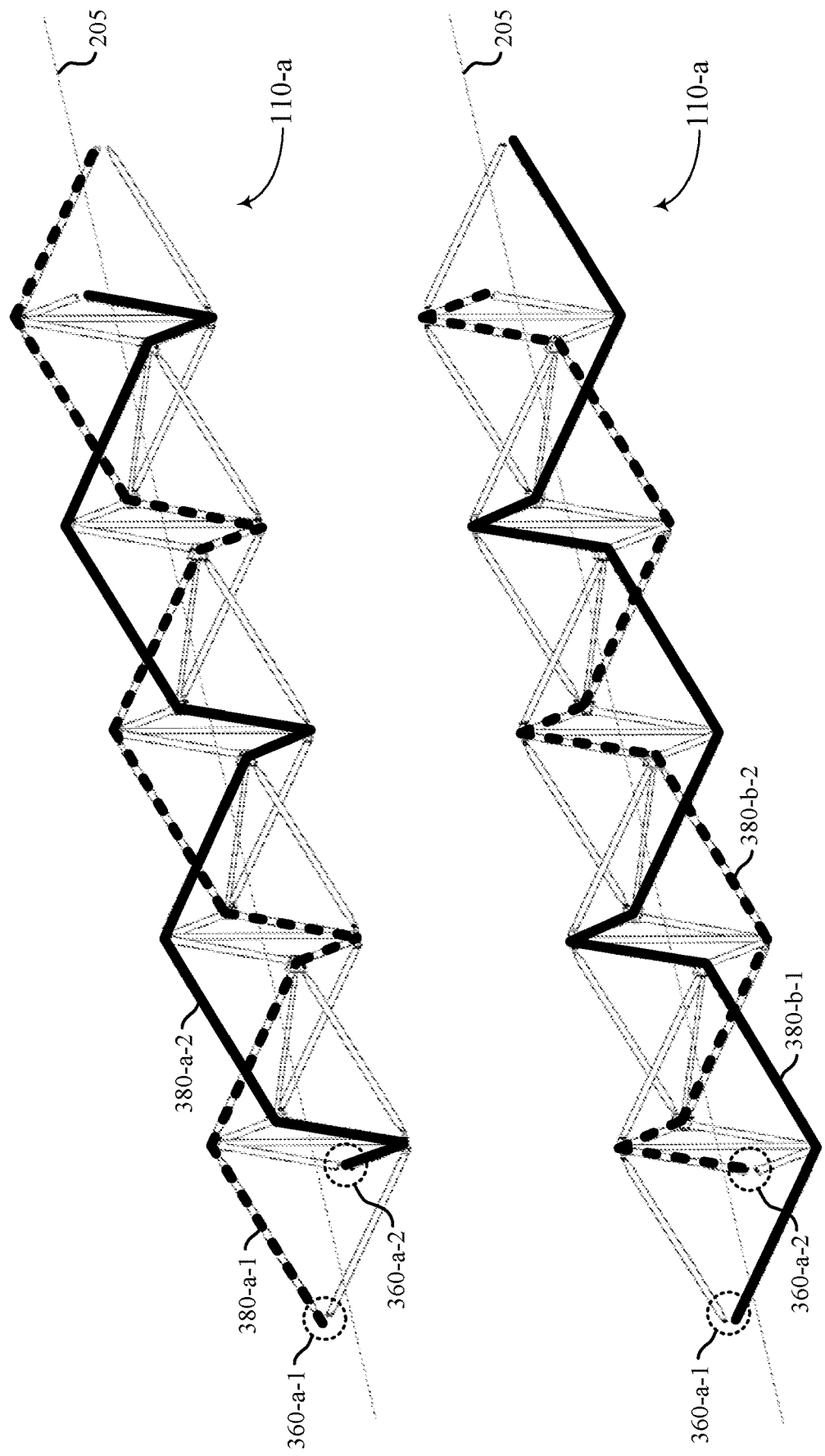

The collection of structural members of the structural assembly 110-*a* may be an example of structural members that form sets of helical structural paths 380, including those illustrated in FIG. 3D. For example, the structural assembly 110-*a* may include a helical structural path 380-*a*-1 with an end at the end node 360-*a*-1, and a helical structural path 380-*a*-2 with an end at the end node 360-*a*-2, where both of the helical structural path 380-*a*-1 and the helical structural path 380-*a*-2 wind in the same direction (e.g., co-rotating in a clockwise direction when viewed along or otherwise progressing along the axis 205, from the end nodes 360-*a*-1 and 360-*a*-2, respectively). Further, the structural assembly 110-*a* may include a helical structural path 380-*b*-1 with an end at the end node 360-*a*-1, and a helical structural path 380-*b*-2 with an end at the end node 360-*a*-2, where both of the helical structural path 380-*b*-1 and the helical structural path 380-*b*-2 wind in the same direction (e.g., co-rotating in a counterclockwise direction when viewed along or otherwise progressing along the axis 205, from the end nodes 360-*a*-1 and 360-*a*-2, respectively).

In the example of the structural assembly 110-*a*, each member (e.g., diagonal member 310) of the described helical structural paths 380-*a* and 380-*b* may be non-parallel with the axis 205, and non-parallel with a plane that is perpendicular to the axis 205. Further, the example of structural assembly 110-*a* may illustrate an example of regular helical structural paths 380, where each diagonal member 310 has a same length or vector component along a direction parallel to the axis 205, and adjacent diagonal members 310 of a respective helical structural path 380 may have a same angle between them when viewed along the axis 205 (e.g., as measured in a plane perpendicular to the axis 205, as measured in a plane parallel to the radial direction 152 and the transverse direction 153). In other examples, helical structural paths 380 in accordance with the present disclosure may be irregular, such as having a different "diameter" (e.g., offset from the axis 205) at different positions along the axis 205, having a different diameter along a radial direction than a diameter along a transverse direction (e.g., being substantially oval-shaped when viewed along the axis 205), having different spacing between nodes along the axis 205 (e.g., tighter "coils" with smaller spacing in the longitudinal direction 151 along the axis 205), or combinations thereof.

In the example of structural assembly 110-a, the helical structural paths 380 may be formed by the diagonal members 310, and may combine to support particular characteristics. For example, the helical structural paths 380 illustrate an example of a solar collector assembly 100 (e.g., a structural assembly 110) having one or more sets of non-coincident or co-rotating helical structural paths 380 (e.g., a first set comprising helical structural paths 380-a-1 and 380-a-2, a second set comprising helical structural paths 380-b-1 and 380-b-2) that are connected or coupled by structural members (e.g., axial members 210, radial members 210-a and lateral members 210-b) that are separate from the helical structural paths 380. In the example of structural assembly 110-a, the co-rotating helical structural paths 380 may be coupled by structural members that are perpendicular to an axis (e.g., axis 205) of the helical structural paths 380, which may be aligned in different directions (e.g., radial members 210-a in the radial direction 152, lateral members 210-b in the transverse direction 153). Further, the helical structural paths 380 illustrate an example of a solar collector assembly 100 (e.g., a structural assembly 110) having one or more sets of coincident or counter-rotating helical structural paths 380 (e.g., helical structural paths 380 rotating in opposite directions along the axis 205, a set comprising or consisting of a left-handed helical structural path 380 and a right-handed helical structural path 380) that include, emanate from, or terminate at a same structural node (e.g., counter-rotating helical structural paths 380-a-1 and 380-b-1 emanating from end node 360-a-1, counter-rotating helical structural paths 380-a-2 and 380-b-2 emanating from end node 360-a-2), and have common structural nodes or connections along their length.

In some examples, counter-rotating helical structural paths 380 in accordance with the present disclosure may share certain nodes, and be separated at other nodes. For example, the set of counter-rotating helical structural paths 380-a-1 and 380-b-1 may share end node 360-a-1, be separated by radial member 210-a-1, share right node 335-a-1, be separated by radial member 210-a-2, and so on. In another example, the set of counter-rotating helical structural paths 380-a-1 and 380-b-2 may emanate from different nodes (e.g., end nodes 360-a-1 and 360-a-2, respectively), but may share top node 320-a-1, be separated by lateral member 210-b-1, share bottom node 325-a-2, be separated by lateral member 210-b-2, and so on. Thus, the helical structural paths 380 illustrate an example of a solar collector assembly 100 (e.g., a structural assembly 110) having one or more sets of coincident or counter-rotating helical structural paths 380 (e.g., helical structural paths 380 rotating in opposite directions along the axis 205, a set comprising or consisting of a left-handed helical structural path 380 and a right-handed helical structural path 380) that have a plurality of common structural nodes or connections along their length Accordingly, the example of structural assembly 110-a may illustrate an example of tetrahedral member groups that combine to form relatively large-diameter helical splines around the perimeter of the frame that are suited to resist shear flow related to internal frame torques, which may include both co-rotating and counter-rotating helical structural paths 380. Although the example of structural assembly 110-a illustrates an example where pairs of co-rotating helical structural paths 380 are formed in a given direction (e.g., a given clock direction along the axis 205, a given rotational direction), other examples of solar collector assemblies 100 or structural assemblies 110 in accordance with the present disclosure may include sets in a given direction having more than two co-rotating helical structural paths 380, such as when a structural assembly 110 includes more than two end nodes 360 at a respective end of the structural assembly 110. Although the helical structural paths 380 of the structural assembly 110-a are shown as starting and ending on opposite sides (e.g., along the transverse direction 153), in other examples, a structural assembly 110 may have helical structural paths 380 that start and end on the same side (e.g., along the transverse direction 153), such as when the structural assembly has an even number of radial members 210-a, an odd number of lateral members 210-b, or both (e.g., compared to the structural assembly 110-a, which has an odd number of radial members 210-a and an even number of lateral members 210-b).

Figure 4:
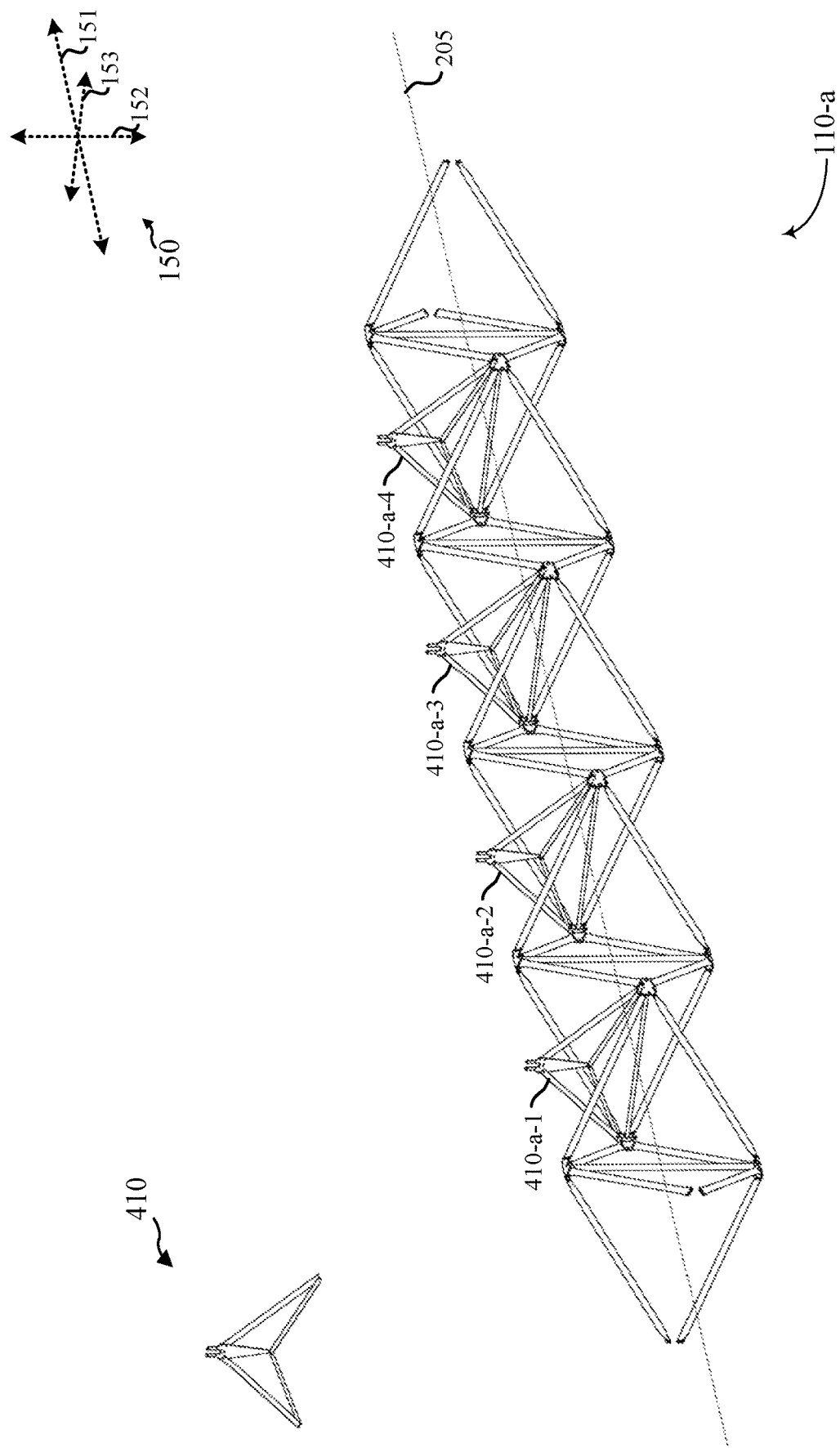
FIG. 4 illustrates an example of receiver support bases that may be included in a solar collector assembly in accordance with aspects of the present disclosure.

FIG. 4 illustrates an example of receiver support bases 410 that may be included in a solar collector assembly 100 (e.g., in the structural assembly 110-a) in accordance with aspects of the present disclosure. For example, the structural assembly 110-a may include a set of receiver support bases 410-a-1 through 410-a-4, each of which may be considered to be a component of a structural assembly 110 or a receiver assembly 130. In various examples, the receiver support bases 410 may support fixing or anchoring solar receiver tubes (e.g., of a receiver assembly 130) to primary structural nodes of the frame truss (e.g., of the structural assembly 110-a) that are on opposite sides of the axis 205, nodes that are closer to the axis 205 along the radial direction 152 than top nodes 320, nodes that are farther in the radial direction 152 from receiver segments 135 than top nodes 320, or combinations thereof. In some examples, the receiver support bases 410 may be formed from a set of structural members in a chevron shape. In some examples, the receiver support bases 410 may be a fixedly coupled subassembly, such as a weldment, a set of riveted members, or other form of subassembly.

In the example of structural assembly 110-a, each of the receiver support bases 410-a may be associated with a respective lateral member 210-b. For example, receiver support base 410-a-1 may be associated with lateral member 210-b-1, receiver support base 410-a-2 may be associated with lateral member 210-b-2, and so on. Further, receiver support bases 410 may be coupled with or between lateral nodes, such as left nodes 330 and right nodes 335. For example, receiver support base 410-a-1 may be associated with left node 330-a-1 and right node 335-a-1, and so on. In some examples, receiver support bases 410 may be configured to be connected with node connectors, such as lateral node connectors 350 described with reference to FIG. 3B. In other examples, receiver support bases 410 may be configured to be connected directly to lateral members 210-b, or diagonal members 310, or various combinations thereof.

In some examples, the receiver support bases 410 may be configured to be disposed inside, within, or between certain structures of a structural assembly 110, which may support reacting weight or other loading associated with receiver tubes to the space frame nodes. In some examples, receiver support bases 410 may be connected between paired, co-rotating helical structural paths 380 (e.g., between helical structural paths 380-a-1 and 380-a-2, between helical structural paths 380-b-1 and 380-b-2). In some examples, receiver support bases 410 may be connected between paired, counter-rotating helical structural paths 380 (e.g., between helical structural paths 380-a-1 and 380-b-2, between helical structural paths 380-a-2 and 380-b-1), where, in some examples, the counter-rotating helical structural paths 380 may share common nodes or connection points between the receiver support bases 410. In some examples, receiver support bases 410 may share or divide certain loads or structural support with lateral members 210-b.

In various examples, receiver support bases 410 may be predominantly or substantially planar structural members, and may be described as having a set of mounting locations or nodes. For example, in the structural assembly 110-a, the receiver support bases 410-a have two mounting locations, separated predominantly along the transverse direction 153 when installed, that are associated with distributing associated loads or providing structural support between left nodes 330 and right nodes 335. In some examples, distributing mounting locations in this manner may support the receiver support bases 410 themselves being relatively stiff in a plane parallel to the radial direction 152 and the transverse direction 153, or otherwise having a relatively rigid connection with the other portions of the structural assembly 110-a in such a direction (e.g., for relatively high torsional stiffness between the structural assembly 110-a and an associated receiver assembly 130 about the longitudinal direction 151).

The receiver support bases 410 may have another mounting location, separated from the other mounting locations predominantly along the radial direction 152, and centered along the transverse direction 153, that is associated with a coupling with a receiver assembly 130. In some examples, having such a single mounting location of a receiver support base 410 may support having a relatively small profile or penetration through a reflector assembly 120. In some examples, such a mounting location may include a portion that is configured to project through an installed reflector assembly, supporting the installation, alignment, or other adjustment of various other components associated with a receiver assembly (e.g., receiver support arms 810) after a reflector assembly 120, or associated mirror segments 125, are installed in a solar collector assembly 100. Although described as being a single mounting location or node, such a mounting at a receiver support base 410 may have multiple fastening locations, such as multiple bolt holes, multiple threaded screw holes, or others, which, in some examples, may support alignment adjustments between a receiver assembly 130 and a structural assembly 110 (e.g., for alignment relative to a reflector assembly 120).

Although the structural assembly 110-a is illustrated as including receiver support bases 410 that are associated with lateral members 210-b (e.g., left nodes 330 and right nodes 335), in other examples (not shown), receiver support bases 410 may be configured in a different manner. For example, receiver support bases 410, or other components configured for mounting a receiver assembly 130, may be associated with radial members 210-a (e.g., top nodes 320, bottom nodes 325, or a combination thereof). In other words, in other examples of a solar collector assembly 100, structures of a receiver assembly 130 may be connected to top nodes 320, bottom nodes 325, or radial node connectors 340. In some examples, a receiver assembly 130 may be connected with, or otherwise include a structural member or subassembly (e.g., receiver support base) connected at both a top node 320 and a bottom node 325, which may illustrate another example of a receiver assembly that is coupled with a structural assembly 110 at structural nodes that are opposite from one another across an axis 205, or coupled with a structural assembly 110 at each of a set of two or more co-rotating helical structural paths 380, each of a set of two or more counter-rotating helical structural paths 380, or both. Thus, like the receiver support bases 410-a that are each connected with a respective left node 330 and right node 335, receiver support bases that are connected with both a top node 320 and a bottom node 325 (not shown) may be another example of a structural configuration that provides a relatively stiff torsional connection between a receiver assembly 130 and the structural assembly 110, or a relatively stiff torsional connection between a receiver assembly 130 and a reflector assembly 120 (e.g., via a structural assembly 110).

Figure 5:
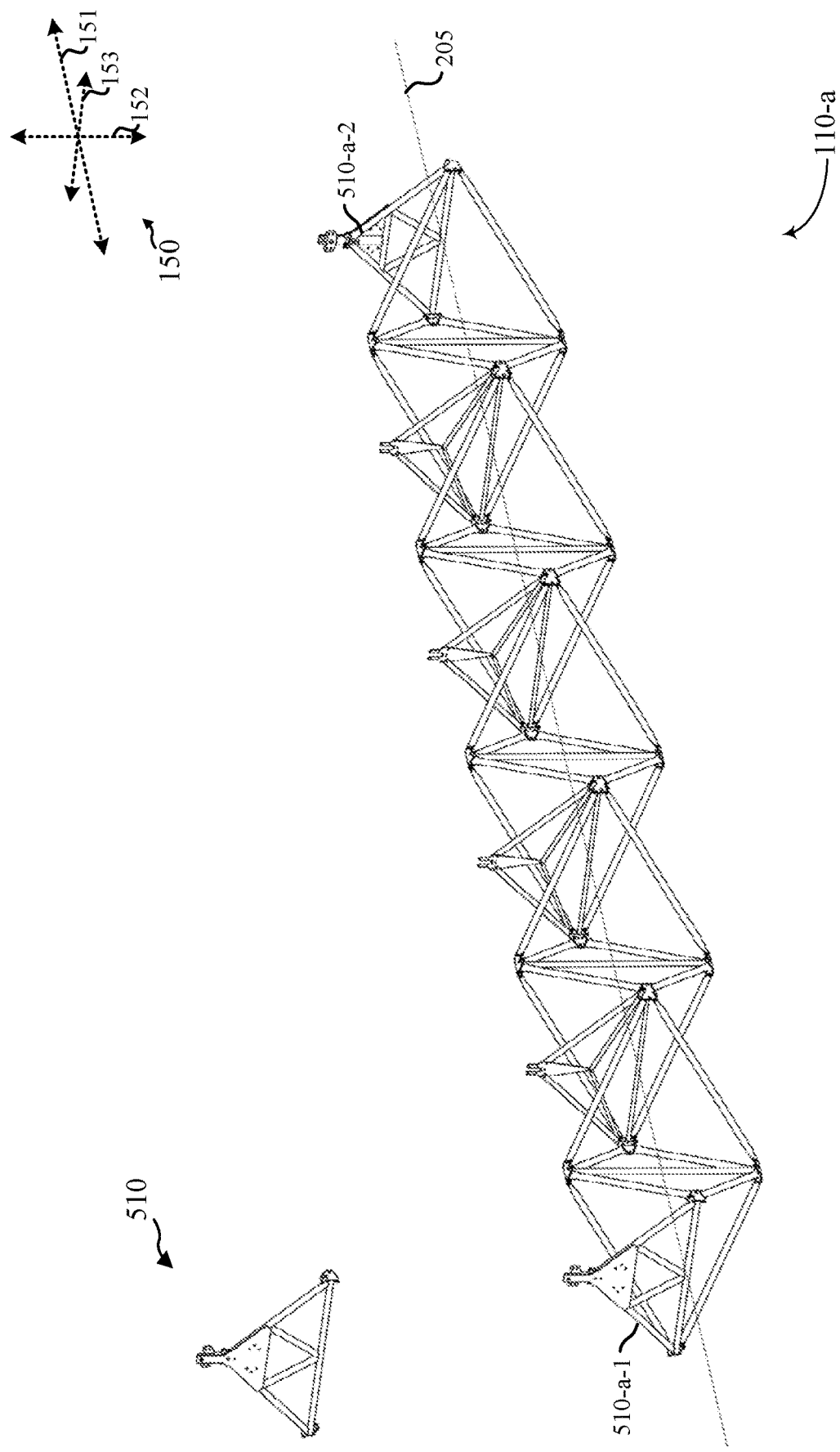
FIG. 5 illustrates an example of end trusses that may be included in a solar collector assembly in accordance with aspects of the present disclosure.

FIG. 5 illustrates an example of end trusses 510 that may be included in a solar collector assembly 100 (e.g., in the structural assembly 110-a) in accordance with aspects of the present disclosure. For example, the structural assembly 110-a may include end trusses 510-a-1 and 510-a-2 disposed at opposite ends of the structural assembly 110-a (e.g., opposite ends of the axis 205). In various examples, the end trusses may support coupling with a reflector assembly 120, a receiver assembly 130, another adjacent structural assembly 110 (not shown), or various combinations thereof. In some examples, the end trusses 510 may be formed from a set of structural members in a triangular shape. In some examples, the end trusses may be a fixedly coupled subassembly, such as a weldment, a set of riveted members, or other form of subassembly.

In the example of structural assembly 110-a, each of the end trusses 510 may be associated with end nodes 360 that are predominantly or substantially separated in the transverse direction 153. Further, the end trusses 510 may each be coupled with a respective radial member 210-a via diagonal members 310. In other words, end trusses 510 may be connected to diagonal members 310 at longitudinal ends of the structural assembly 110-a. In some examples, end trusses 510 may include an integral node connector or hub for coupling with the diagonal members 310. The end trusses 510 may be configured to accumulate and distribute loads, such as torque loads, into an end-of-frame axle assembly (not shown) for interconnection with an adjacent solar collector assembly 100.

In some examples, the end trusses 510 may be configured to be disposed inside, within, or between certain structures of the structural assembly 110-a, which may support reacting weight or other loading associated with mirror segments 125, receiver segments 135, adjacent structural assemblies 110, or other components to the space frame nodes (e.g., end nodes that are on opposite sides of the axis 205, or are otherwise separated from the axis 205). For example, the end trusses 510 may include or be otherwise associated with end nodes or terminations of helical structural paths 380 according to various configurations. In some examples, end trusses 510 may be connected between paired, co-rotating helical structural paths 380 (e.g., between ends of the helical structural paths 380-a-1 and 380-a-2, between ends of the helical structural paths 380-b-1 and 380-b-2). In some examples, end trusses 510 may be connected between paired, counter-rotating helical structural paths 380 (e.g., between ends of the helical structural paths 380-*a*-1 and 380-*b*-2, between ends of the helical structural paths 380-*a*-2 and 380-*b*-1), where, in some examples, the counter-rotating helical structural paths 380 may share common nodes or connection points between the end trusses 510.

In various examples, the end trusses 510 may be predominantly or substantially planar structural members, and may be described as having a set of mounting locations or nodes. For example, in the structural assembly 110-*a*, the end truss 510-*a*-1 may have two mounting locations, separated predominantly along the transverse direction 153 when installed, that are associated with distributing associated loads or providing structural support between a first end node 360-*a*-1 and a second end node 360-*a*-2. In some examples, distributing mounting locations in this manner may support the end trusses 510 themselves being relatively stiff in a plane parallel to the radial direction 152 and the transverse direction 153, or otherwise providing a relatively rigid end support in such a plane.

The end trusses 510 may have another mounting location, separated from the other mounting locations predominantly along the radial direction 152, and centered along the transverse direction 153, that is associated with a coupling with a receiver assembly 130. In some examples, such a location may be substantially aligned with corresponding mounting locations of the receiver support bases 410. For example, an end truss 510 on one or both ends of the structural assembly 110-*a* may serve as a last connection (e.g., associated with a particular solar collector assembly 100) for receiver supports, such as upper receiver support arms 810 described with reference to FIG. 8. In some examples, such a mounting location may include a portion that is configured to project through an installed reflector assembly, supporting the installation, alignment, or other adjustment of various other components associated with a receiver assembly (e.g., receiver support arms 810) after a reflector assembly 120, or associated mirror segments 125, are installed in a solar collector assembly 100. In some examples, having such a single mounting location of an end truss 510 may support having a relatively small profile or penetration through a reflector assembly 120. The end trusses 510 may have another mounting location centered along the transverse direction 153, that is associated with mounting to a pedestal assembly 140 (e.g., via a rotatable coupling), or actuator between the structural assembly 110-*a* and such a pedestal assembly 140.

Although the structural assembly 110-*a* is illustrated as including end trusses 510 that are associated with two end nodes 360 that are separated predominantly in the transverse direction 153, in other examples, end trusses 510 may be configured in a different manner. For example, in other structural assemblies 110, end trusses 510 in accordance with the present disclosure may be associated with two end nodes 360 that are separated predominantly in the radial direction 152, or associated with more than two end nodes 360 (e.g., associated with sets of more than two co-rotating helical structural paths 380), or a combination thereof.

FIGS. 6A through 6D illustrate an example of longitudinal chords 610 that may be included in a solar collector assembly 100 (e.g., in the structural assembly 110-*a*) in accordance with aspects of the present disclosure. In some examples, the longitudinal chords 610 may be predominantly or substantially linear structural members, and may be described as having a direction or axis between opposed ends (e.g., mounting or coupling locations). For example, the structural assembly 110-*a* may include a top chord 610-*a* (e.g., generally connecting or otherwise associated with top nodes 320), a left chord 610-*b*-1 (e.g., generally connecting or otherwise associated with left nodes 330), a right chord 610-*b*-2 (e.g., generally connecting or otherwise associated with right nodes 335), and a bottom chord 610-*c* (e.g., generally connecting or otherwise associated with bottom nodes 325).

The longitudinal chords 610 may be generally described as lengthwise chords spanning perimetral nodes of the structural assembly 110-*a*, and may be configured to stabilize the structural assembly 110-*a* against bending loads and deflections. For example, where the helical structural paths 380 may be configured primarily for reacting torsional loads (e.g., about the axis 205), the longitudinal chords 610 may be configured primarily for reacting bending loads (e.g., about axes perpendicular to the axis 205). Thus, the combination of the longitudinal chords 610 and the helical structural paths 380 may illustrate an example of a structural assembly 110-*a* being configured to react or otherwise support varying loads about different axes. In some examples, a structural assembly 110-*a* may be designed such that bending and torsional loading or stresses are relatively balanced, and, in some examples, the strength, stress, or strain of the longitudinal chords 610 may be within 15% a corresponding characteristic of the diagonal members 310 (e.g., of the helical structural paths 380).

In some examples, the set of longitudinal chords 610-*a*, 610-*b*-1, 610-*b*-2, and 610-*c* may represent a minimum set of longitudinal chords 610, where pairs of longitudinal chords 610 are directionally opposite from each other across the axis 205 in the radial direction 152 (e.g., according to top chord 610-*a* and bottom chord 610-*c*) and in the lateral direction (e.g., according to left chord 610-*b*-1 and right chord 610-*b*-2). In other examples, structural assemblies 110 in accordance with the present disclosure may have two pairs of longitudinal chords that are directionally opposite from each other across the axis 205 along different directions, or may have more than two pairs of longitudinal chords 610 that are parallel to an axis 205, and disposed on opposite sides of the axis 205.

The longitudinal chords 610 may be disposed in a manner that couples or connects structural nodes that are adjacent in the longitudinal direction 151 (e.g., parallel to the axis 205). For example, the top chord 610-*a* may be coupled with each of the top nodes 320, the bottom chord 610-*c* may be coupled with each of the bottom nodes 325, the left chord 610-*b*-1 may be coupled with each of the left nodes 330, and the right chord 610-*b*-2 may be coupled with each of the right nodes 335. In some examples, the longitudinal chords 610 may be referred to as peripheral bracing members that span between ends of alternating axial members 210 (e.g., between radial members 210-*a* that are adjacent in the longitudinal direction 151, between transverse members 210-*b* that are adjacent in the longitudinal direction 151). The top chord 610-*a*, for example, may also be connected to the end trusses 510, such as a connection between the top chord 610-*a* and the end truss 510-*a*-1 at a chord end node 620-*a*-1 and a connection between the top chord 610-*a* and the end truss 510-*a*-2 at a chord end node 620-*a*-2. Thus, whereas the bottom chord 610-*c* spans between a first and last bottom node 325 (e.g., in the longitudinal direction 151), the top chord 610-*a* spans beyond a first and last top node 320 (e.g., in the longitudinal direction 151), and between chord end nodes 620, which may be supported by the top chord 610-*a* being longer than the bottom chord 610-*c*.

In examples of structural assemblies 110 that include receiver support bases 410, such as structural assembly 110-a, connections may also be made between longitudinal chords 610 and the receiver support bases 410. For example, according to structural assembly 110-a, the top chord 610-a may be connected with each of the receiver support bases 410-a-1 through 410-a-4 at a respective chord node 625-a. In some examples, where such connections are made, the receiver support bases 410 may gusset longitudinal chords 610 against bending or buckling, which may be supported by a chevron shape of a receiver support base 410, or other shape.

In some examples, one or more of the longitudinal chords 610 may be formed by a set of subcomponents, such as chord members 615 as illustrated in the example of structural assembly 110-a. In some examples, a determination to form longitudinal chords 610 by length-wise subcomponents, or the determination of lengths of chord members 615 themselves, may be based at least in part on transportation constraints (e.g., a maximum or preferred length of component to be transported). In various examples, splices between chord members 615 may be made at node connectors or hub connectors of a (e.g., at a common structural node shared by a longitudinal chord 610 and another component), or at any other point along the longitudinal chords 610 (e.g., between common structural nodes, at a connection point not shared with the longitudinal chord 610 and another component).

In some examples, chord members 615 may have a common length, a common configuration (e.g., mounting connection, termination configuration), or both, which may reduce a quantity of unique parts in the structural assembly 110-a, or reduce assembly complexity associated with the structural assembly 110-a. For example, chord member 615-a-2 of the top chord 610-a may have a same configuration as chord member 615-b-2 of the bottom chord 610-c. Further, the left chord 610-b-1 and the right chord 610-b-2 may have the same configuration, such that chord member 615-c-1 has a same configuration as 615-c-3, and so on. In some examples (e.g., where the top chord 610-a and the bottom chord 610-c have different lengths), chord members 615-a-1 and 615-e-a may have different lengths. Although the longitudinal chords 610 of the structural assembly 110-a show one illustrative example, other configurations of longitudinal chords 610 or chord members 615 may be used to support the techniques described herein.

In some examples, hub connections and longitudinal chords 610 may be configured such that a connection can be made at a structural node without an interruption to the longitudinal chord 610, which may support a single longitudinal chord 610 spanning across multiple hub connections. For example, chord members 615-a-1, 615-b-1, and 615-a-2 may be connected to form a unitary top chord 610-a, which may subsequently be connected to each of the top nodes 320 (e.g., to each of the associated radial node connector 340) and each of the receiver support bases 410. In some examples, the structural assembly 110-a may be configured such that longitudinal chords 610 may be connected from the outside of associated hub connectors (e.g., installing longitudinal chords 610 from the direction opposite the axis 205). For example, as illustrated in the detail view of FIG. 6B, associated with the top node 320-a-3 but generally applicable to other top nodes 320, each of the radial member 210-a-3 and the diagonal members 310-a-9 through 310-a-12 may be connected to the radial node connector 340-a (e.g., at the top node 320-a-3), and the top chord 610-a may be installed from the top of the radial node connector 340-a.

Figure 6A:
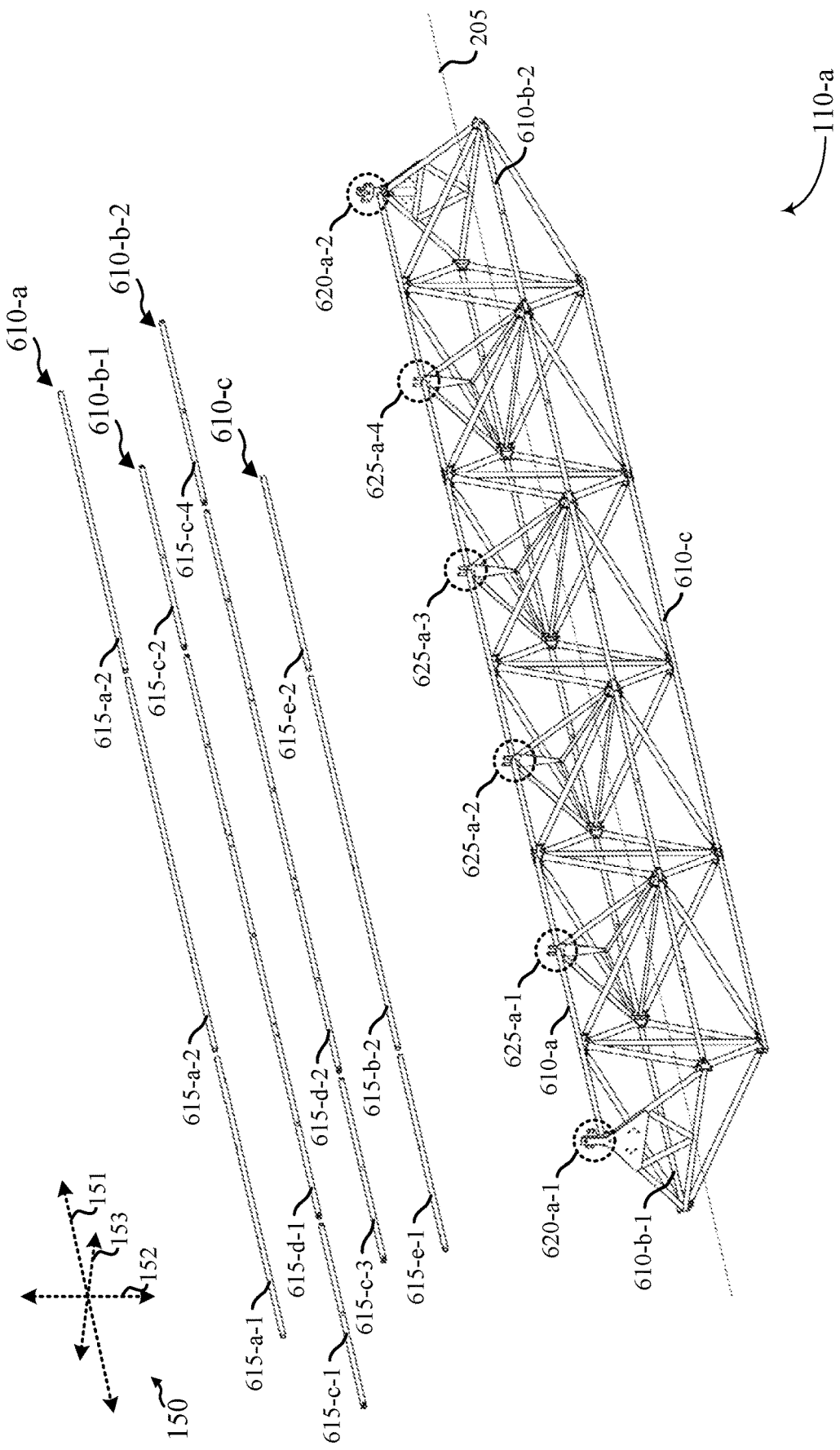
FIGS. 6A through 6D illustrate an example of longitudinal chords that may be included in a solar collector assembly in accordance with aspects of the present disclosure.
Figure 6B:
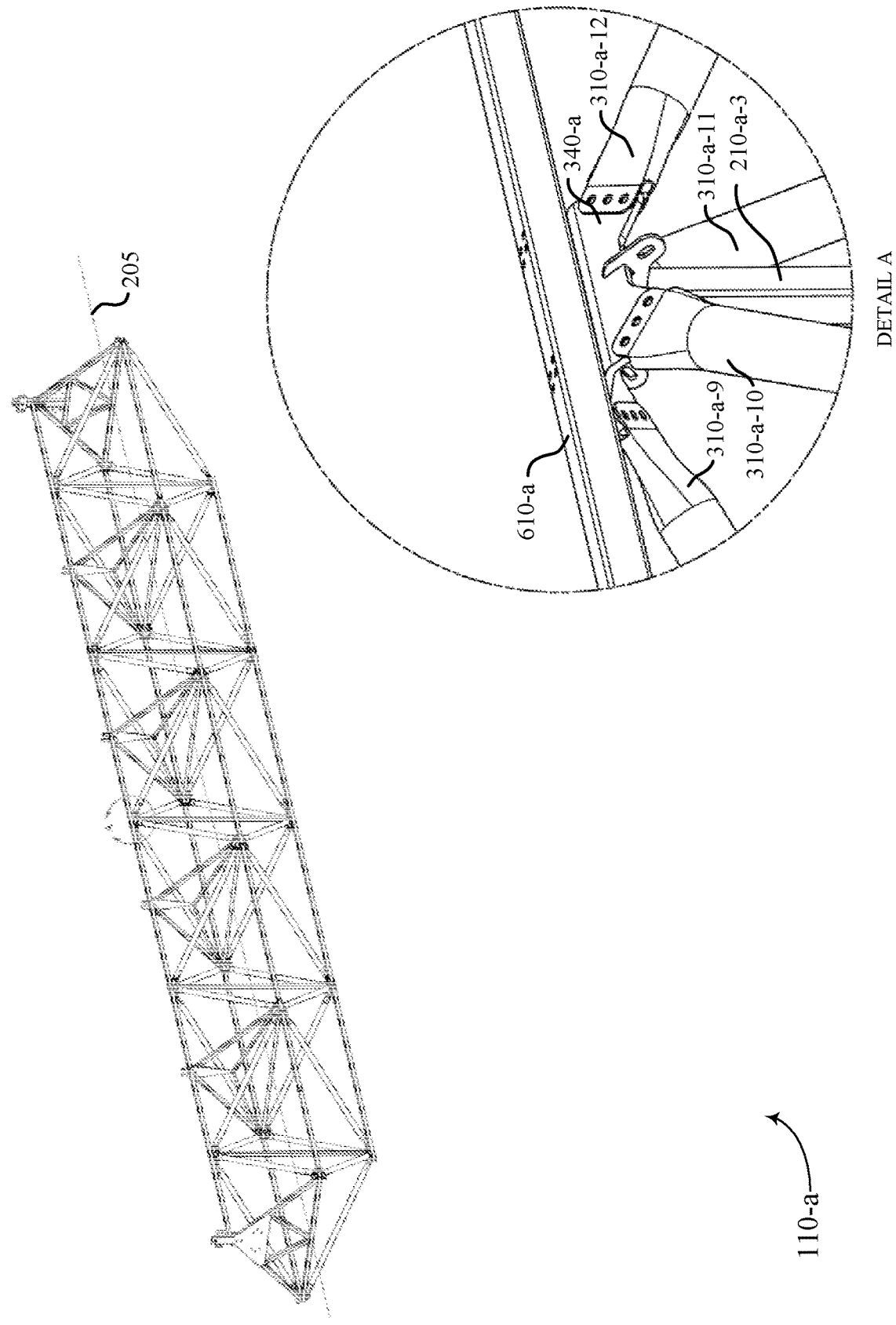
Figure 6C:
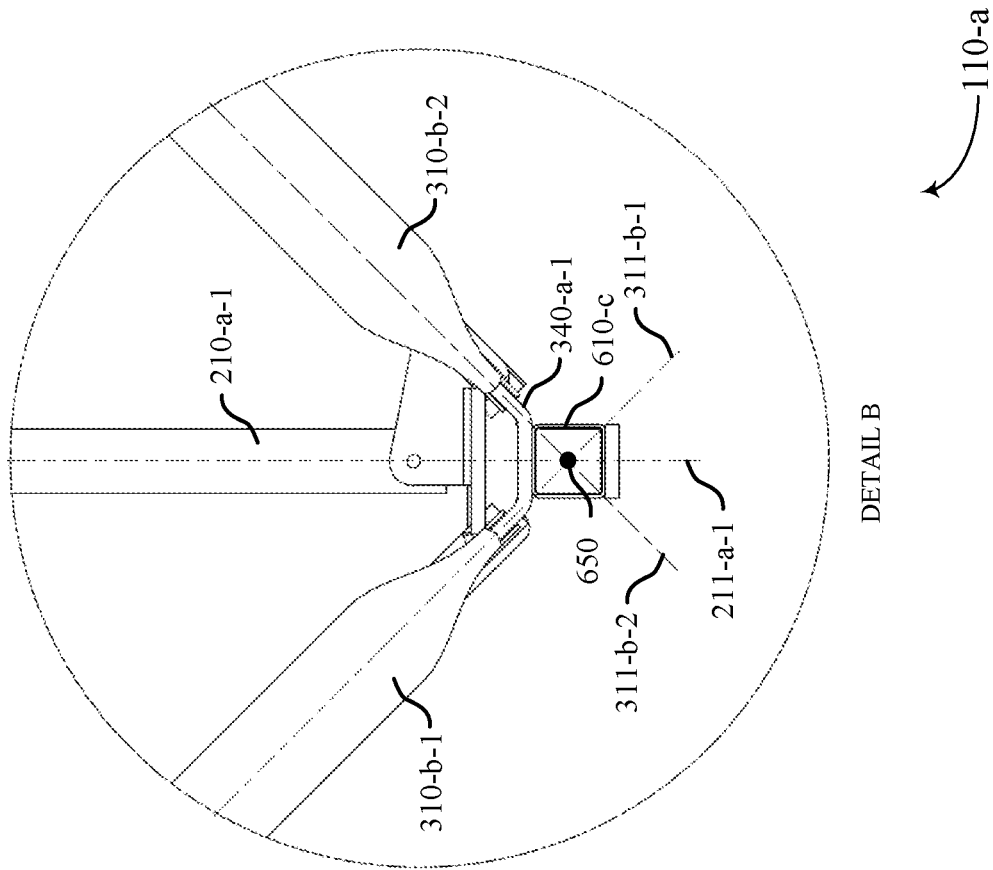
Figure 6C:
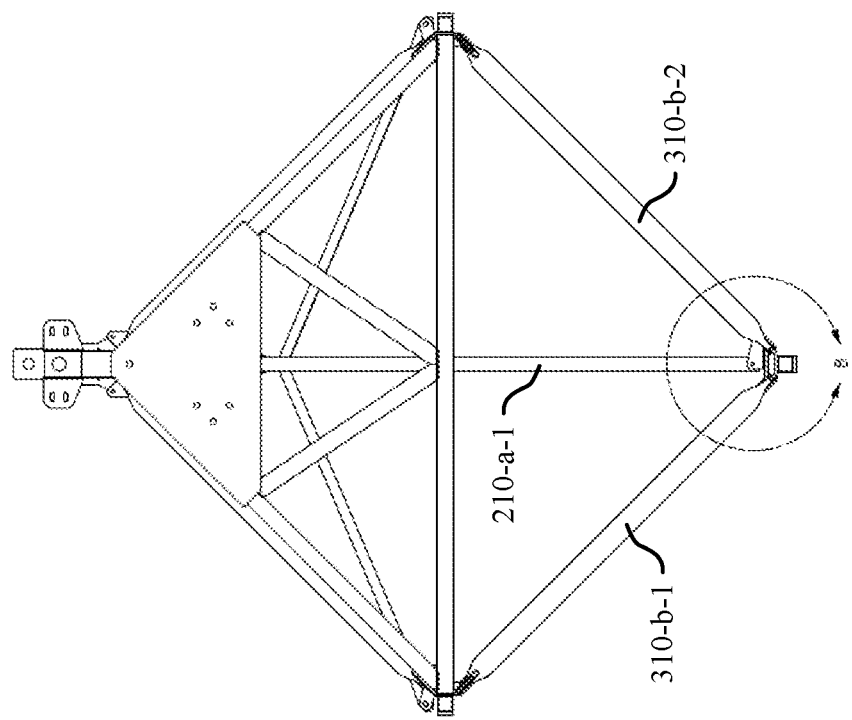

In some examples, a structural assembly 110 may be configured such that the centroid of the structural members connected at a structural node are aligned at a space frame node point, which may be beneficial to the performance of the space frame. For example, as illustrated in FIG. 6C, associated with the bottom node 325-a-1 but generally applicable to other bottom nodes 325, the diagonal member 310-b-1 may be associated with a centroidal axis 311-b-1, the diagonal member 310-b-2 may be associated with a centroidal axis 311-b-2, and the radial member 210-a-1 may be associated with a centroidal axis 211-a-1. Additionally, the bottom chord 610-c may be associated with a centroidal axis 611-c that is not shown in the view of FIG. 6C, but is similarly aligned along the length of the bottom chord 610-c (e.g., parallel to the longitudinal direction 151). Each of the radial member 210-a-1, the diagonal members 310-b-1 and 310-b-2, and the bottom chord 610-c may be connected at the radial node connector 340-a-1, and the system may be designed such that the centroidal axes 211-a-1, 311-b-1, 311-b-2, and 611-c intersect at the node point 650.

In the example of structural assembly 110-a, the node point 650 may be located outside the body of the radial node connector 340-a-1 (e.g., non-coincident with a material of the radial node connector 340-a-1, not enclosed by any portion of the radial node connector 340-a-1), which may support the bottom chord 610-c being installed to or removed from the structural assembly 110-a without disassembling other components from the radial node connector 340-a-1. Moreover, because the node point 650 is outside the body of the radial node connector 340-a-1, the design of the radial node connector 340-a-1 may support the bottom chord 610-c connecting to multiple radial node connector 340 (e.g., across multiple bottom nodes 325) without interruption in the bottom chord 610-a. Although described with reference to connections made at a bottom node 325, similar techniques may be applied to other nodes and connectors of a structural assembly 110 to support spanning multiple nodes with uninterrupted longitudinal chords 610.

Figure 6D:
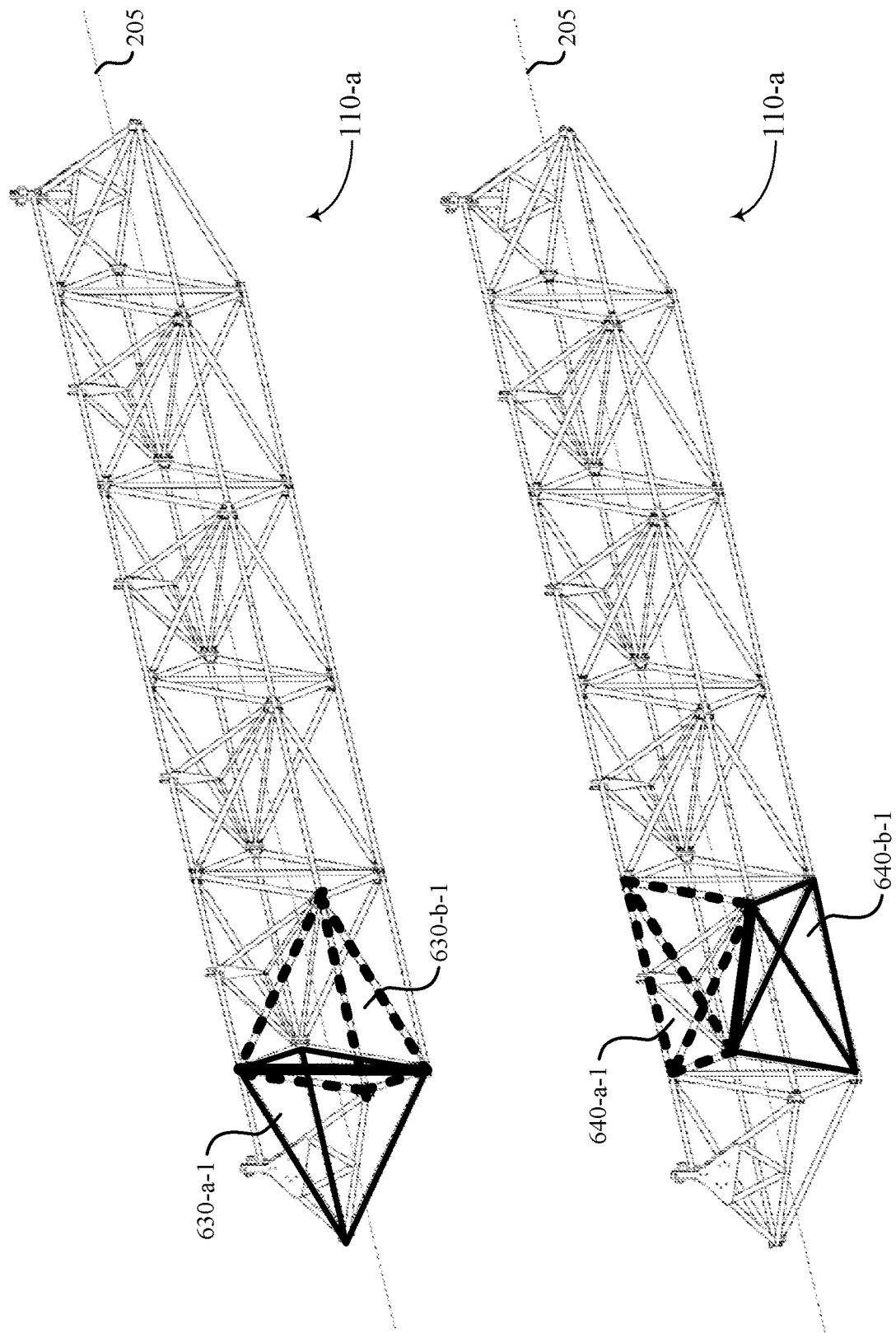

As illustrated in FIG. 6D, the addition of the longitudinal chords 610 also generates additional repetitions of tetrahedra along the axis 205 that further aid in establishing the three dimensional structural frame's resistance to imposed loading conditions. For example, the addition of the longitudinal chords 610, which may be associated with additional tetrahedral structures or volumes, may further enable the structural assembly 110-a to efficiently resist bending loads from coming from any perpendicular direction relative to the frame's central axis (e.g., axis 205).

In some examples, by including the left chord 610-b-1 and the right chord 610-b-2, the structural assembly 110-a may include left tetrahedra 630-a and right tetrahedra 630-b that are symmetric or reflective across the axis 205 (e.g., in the transverse direction 153). For example, the structural assembly 110-a may include left tetrahedron 630-a-1 and right tetrahedron 630-b-1, which share a common structural member or edgewise connection associated with the radial member 210-a-1. In some examples, by including the top chord 610-a and the bottom chord 610-c, the structural assembly 110-a may include top tetrahedra 640-a and bottom tetrahedra 640-b that are also symmetric or reflective across the axis 205 (e.g., in the radial direction 152). For example, the structural assembly 110-a may include top tetrahedron 640-a-1 and bottom tetrahedron 640-b-1, which share a common structural member or edgewise connection associated with the lateral member 210-b-1. Thus, according to various examples of the present disclosure, the structural assembly 110-*a* may include sets or pairs of tetrahedral structure or volumes that are on opposite sides of the axis 205 in a given direction.

The addition of the longitudinal chords 610 is also an example of supporting non-coincident or co-rotating helical structural paths 380 in a direction parallel to an axis of the helical structural paths 380 (e.g., axis 205). For example, the set of co-rotating helical structural paths 380-*a*-1 and 380-*a*-2, or the set of co-rotating helical structural paths 380-*b*-1 and 380-*b*-2, or the combination thereof, may be supported by the lengthwise top chord 610-*a*, left chord 610-*b*-1, right chord 610-*b*-2, and bottom chord 610-*c*, which may each span the length (e.g., along the longitudinal direction) of the associated nodes. Thus, the structural assembly 110-*a* illustrates an example for providing pairs of coaxial helical structural paths 380 that co-rotate in the same direction along a longitudinal direction (e.g., either clockwise or counterclockwise), and are also supported by structural members (e.g., longitudinal chords 610, chord members 615) that are parallel with the longitudinal direction.

Although the structural assembly 110-*a* is illustrated as having longitudinal chords 610 that are substantially straight (e.g., along the longitudinal direction 151), the longitudinal chords 610 may bend or otherwise be distorted (e.g., shortened or lengthened) due to various load conditions of the structural assembly 110-*a*. In one example, gravity loading of the structural assembly 110-*a* may cause the structural assembly 110-*a* to sag between vertical supports such as pedestal assemblies 140 (not shown). Thus, under some circumstances, such as when the radial direction 152 is aligned in a vertical direction, the top chord 610-*a* may be loaded in compression by gravitational loading and accordingly be shortened (e.g., reducing distance between top nodes 320 and chord nodes 625), or the bottom chord 610-*c* may be loaded in tension by gravitational loading and accordingly be lengthened (e.g., increasing distance between bottom nodes 325), or a combination thereof. To counteract effects of gravitational loading (e.g., predicted loading, loading corresponding to common loading conditions or alignments of a solar collector assembly 100), the lengths of structural members of a structural assembly 110 may thus be manipulated according to a desired alignment of the structural assembly 110 under predicted load conditions. For example, to counteract the described effects of gravity, the top chord 610-*a* may be nominally lengthened (e.g., with increased spacing between top nodes 320 and chord nodes 625) and the bottom chord 610-*c* may be nominally shortened (e.g., with reduced spacing between bottom nodes 325), to support a preload or pre-distortion of the structural assembly 110-*a* (e.g., a curvature along the longitudinal direction 151 that is upward in the radial direction 152), such that, in the presence of gravitational load, the structural assembly 110-*a* sags into a substantially straight configuration (e.g., along the longitudinal direction 151).

Figure 7:
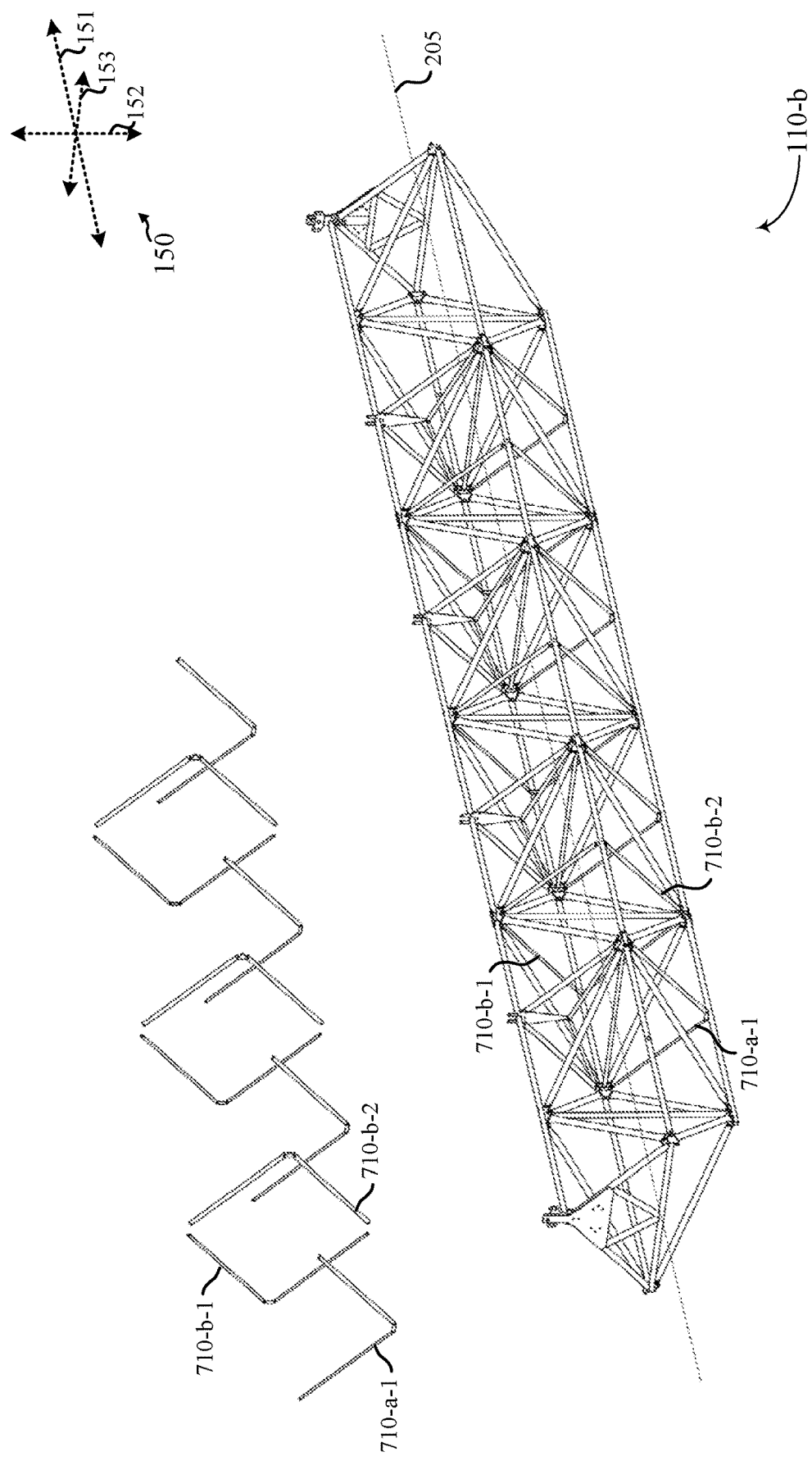
FIG. 7 illustrates an example of chord braces that may be included in a solar collector assembly in accordance with aspects of the present disclosure.

FIG. 7 illustrates an example of chord braces 710 that may be included in a solar collector assembly 100 (e.g., in the structural assembly 110-*b*) in accordance with aspects of the present disclosure. Chord braces 710 may be included in some structural assemblies 110 when buckling of longitudinal chords 610 is of concern. For example, a structural assembly 110 may include lateral chord braces 710-*a*, associated with lateral members 210-*b*, or associated with left nodes 330 and right nodes 335. Additionally or alternatively, a structural assembly 110 may include radial chord braces 710-*b*, associated with radial members 210-*a*, or associated with top nodes 320 and bottom nodes 325. For example, the structural assembly 110-*b* is shown as including both lateral chord braces 710-*a* and radial chord braces 710-*b*. Such braces may be included to support longitudinal chords 610 being made from lighter or thinner tubes, for example, but may be omitted from some locations in a structural assembly 110, or may be omitted from a structural assembly 110 altogether.

Figure 8:
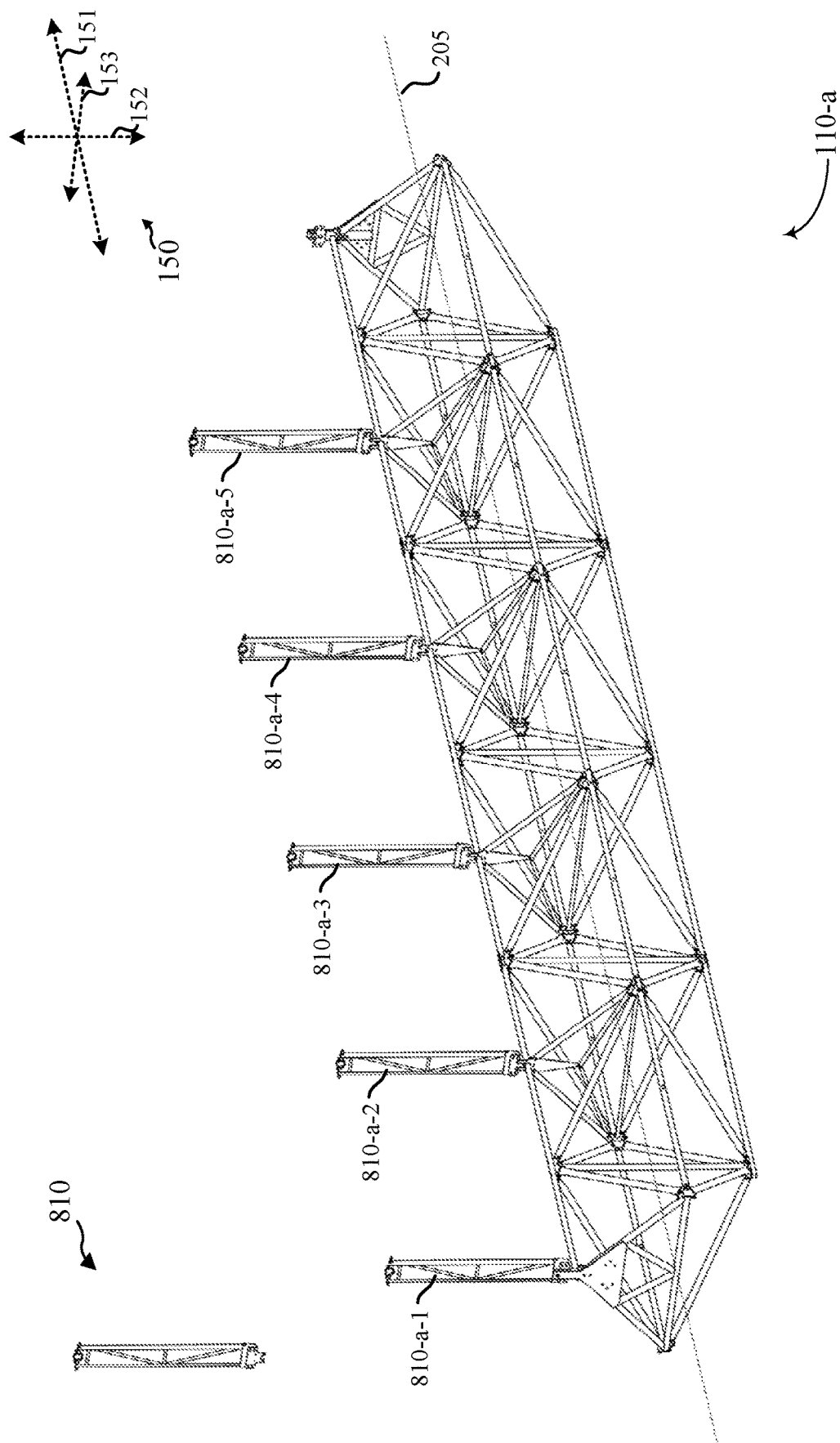
FIG. 8 illustrates an example of receiver support arms that may be included in a solar collector assembly in accordance with aspects of the present disclosure.

FIG. 8 illustrates an example of receiver support arms 810 that may be included in a solar collector assembly 100 (e.g., in the structural assembly 110-*a*) in accordance with aspects of the present disclosure. The receiver support arms 810 may provide a structural connection between receiver segments 135 and receiver support bases 410 or end trusses 510, and in various examples may be considered to be a component of a structural assembly 110 or a receiver assembly 130. In some examples, the receiver support arms may be a fixedly coupled subassembly, such as a weldment, a set of riveted members, or other form of subassembly.

The example of structural assembly 110-*a* includes a set of receiver support arms 810-*a*-1 through 810-*a*-5, where the receiver support arm 810-*a*-1 is associated with one end of the structural assembly 110-*a* (e.g., the end truss 510-*a*-1). In some examples, a receiver support arm 810 may be omitted from the opposite end of the structural assembly 110-*a*, such as when another structural assembly 110 is mounted adjacent to the structural assembly 110-*a* and otherwise provides a support for an associated receiver segment 135.

In some examples, a receiver support arm 810 may include a portion having slots that correspond to mounting locations on an associated receiver support base 410 or end truss 510. Such slots may support adjustment between associated components, supporting, for example, receiver support arms 810 being aligned with an assembly or alignment jig or fixture (e.g., to align receiver segments 135 relative to a reflector assembly 120. In some examples, plate material associated with the interconnection between a receiver support arm 810 and an associated receiver support base 410 or end truss 510 may also create a double thickness portion, such as a portion that passes through a gap in a reflector assembly 120, which may reduce stresses and deflections at that squeeze point.

Figure 9:
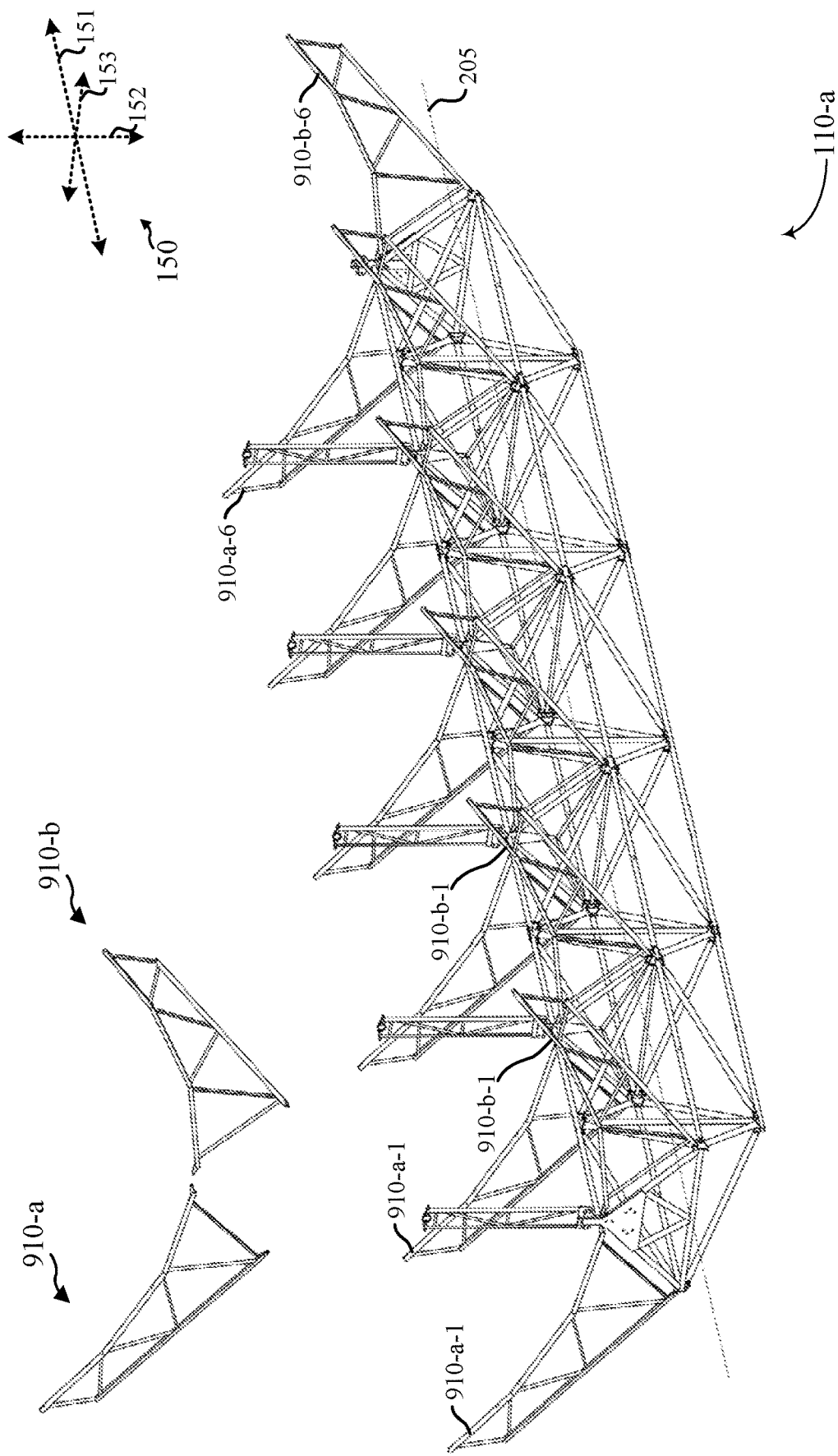
FIG. 9 illustrates an example of mirror arms that may be included in a solar collector assembly in accordance with aspects of the present disclosure.

FIG. 9 illustrates an example of mirror arms 910 (e.g., reflector support structures) that may be included in a solar collector assembly 100 (e.g., in the structural assembly 110-*a*) in accordance with aspects of the present disclosure. For example, the structural assembly 110-*a* may include a set of left mirror arms 910-*a*-1 through 910-*a*-6 and a set of right mirror arms 910-*b*-1 through 910-*b*-6, each of which may be considered to be a component of a structural assembly 110 or a reflector assembly 120. In various examples, the mirror arms 910 may support fixing or anchoring mirror segments 125, or intervening structures thereof, to primary structural nodes of the frame truss (e.g., of the structural assembly 110-*a*). In some examples, the mirror arms 910 may be a fixedly coupled subassembly, such as a weldment, a set of riveted members, or other form of subassembly.

In the example of structural assembly 110-*a*, each of the mirror arms 910 may be associated with a respective lateral member 210-*b* or end truss 510. For example, mirror arms 910-*a*-1 and 910-*b*-1 may be associated with the end truss 510-*a*-1, mirror arms 910-*a*-2 and 910-*b*-2 may be associated with the lateral member 210-*b*-1, and so on. In some examples, a mirror arm 910 may be otherwise coupled with or between an end node 360 and a chord end node 620. For example, left mirror arm 910-*a*-1 may be coupled with or between end node 360-*a*-1 and chord end node 620-*a*-1, right mirror arm 910-*b*-1 may be coupled with or between end node 360-*a*-2 and chord end node 620-*a*-1, and so on. In some examples, a mirror arm 910 may be coupled with or between a lateral node (e.g., a left node 330 or a right nodes 335) and a chord node 625. For example, left mirror arm 910-*a*-2 may be coupled with or between left node 330-*a*-1 and chord node 625-*a*-1, right mirror arm 910-*b*-2 may be coupled with or between right node 335-*a*-1 and chord node 625-*a*-1, and so on. In some examples, mirror arms 910 may be configured to be connected with node connectors, such as lateral node connectors 350 described with reference to FIG. 3B. In other examples, mirror arms 910 may be configured to be connected directly to lateral members 210-*b*, diagonal members 310, receiver support bases 410, end trusses 510, longitudinal chords 610, or various combinations thereof.

In various examples, the mirror arms 910 may be predominantly or substantially planar structural members, and may be described as having a set of mounting locations or nodes (e.g., a pair of mounting locations, offset in both the radial direction 152 and the transverse direction 153). In some examples, distributing mounting locations in this manner may support the mirror arms 910 themselves being relatively stiff in a plane parallel to the radial direction 152 and the transverse direction 153, or otherwise having a relatively rigid connection with the other portions of the structural assembly 110-*a* in such a direction (e.g., for relatively high torsional stiffness between the structural assembly 110-*a* and an associated reflector assembly 120 about the longitudinal direction 151). In some examples, the mirror arms 910 may be predominantly or substantially aligned with planar receiver support bases 410, receiver support arms 810, or both, which may further support stiffness or relative alignment (e.g., about a longitudinal direction 151, in a plane parallel to the radial direction 152 and transverse direction 153) between receiver segments 135 and a reflector assembly 120 (e.g., mirror segments 125), which may support the optical precision of a solar collector assembly, and related efficiency of collecting incident solar energy.

In some examples, the mirror arms 910 may bend or otherwise be distorted (e.g., deflected, flattened) due to various load conditions of a structural assembly 110. In one example, gravity loading of the mirror arms 910-*a* or 910-*b* may cause the reflector assembly 120 to sag downward towards its transverse ends (e.g., droop in the radial direction 152 as a function of distance, away from the axis 205, in the transverse direction 153). To counteract effects of gravitational loading (e.g., predicted loading, loading corresponding to common loading conditions or alignments of a solar collector assembly 100), the dimensions of the mirror arms 910 may thus be manipulated according to a desired alignment of the reflector assembly 120 under predicted load conditions. For example, to counteract the described effects of gravity, mirror arms 910 may be nominally configured with more upward alignment or a tighter curvature than a desired operational position, thereby supporting a preload or pre-distortion of the reflector assembly 120 (e.g., a curvature along the transverse direction 153 that is farther upward in the radial direction 152 than a desired operational configuration). In the presence of gravitational load, the reflector assembly 120 may accordingly sag into a desired configuration (e.g., having a desired focal configuration upon the application of gravitational loading).

Figure 10:
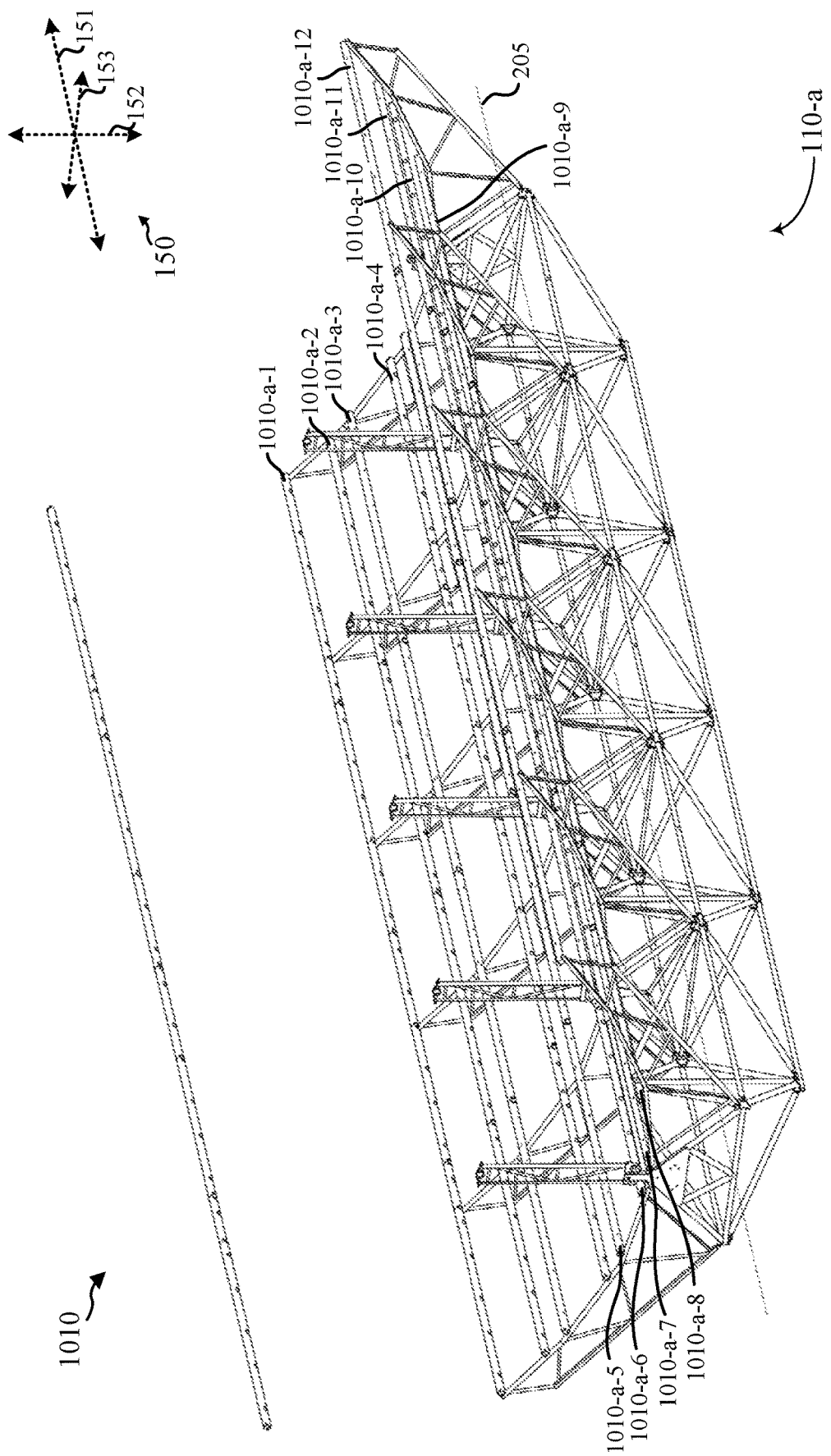
FIG. 10 illustrates an example of mirror stringers that may be included in a solar collector assembly in accordance with aspects of the present disclosure.

FIG. 10 illustrates an example of mirror stringers 1010 that may be included in a solar collector assembly 100 (e.g., in the structural assembly 110-*a*) in accordance with aspects of the present disclosure. The mirror stringers 1010 may be described as, or referred to as "purlins," and illustrate an example of structural members that may be configured for mounting the mirror segments 125. The example of FIG. 10 may illustrate a set of mirror stringers 1010-*a*-1 through 1010-*a*-12 that may be included in a solar collector assembly 100, each of which may be considered to be a component of a structural assembly 110 or a reflector assembly 120.

Figure 11:
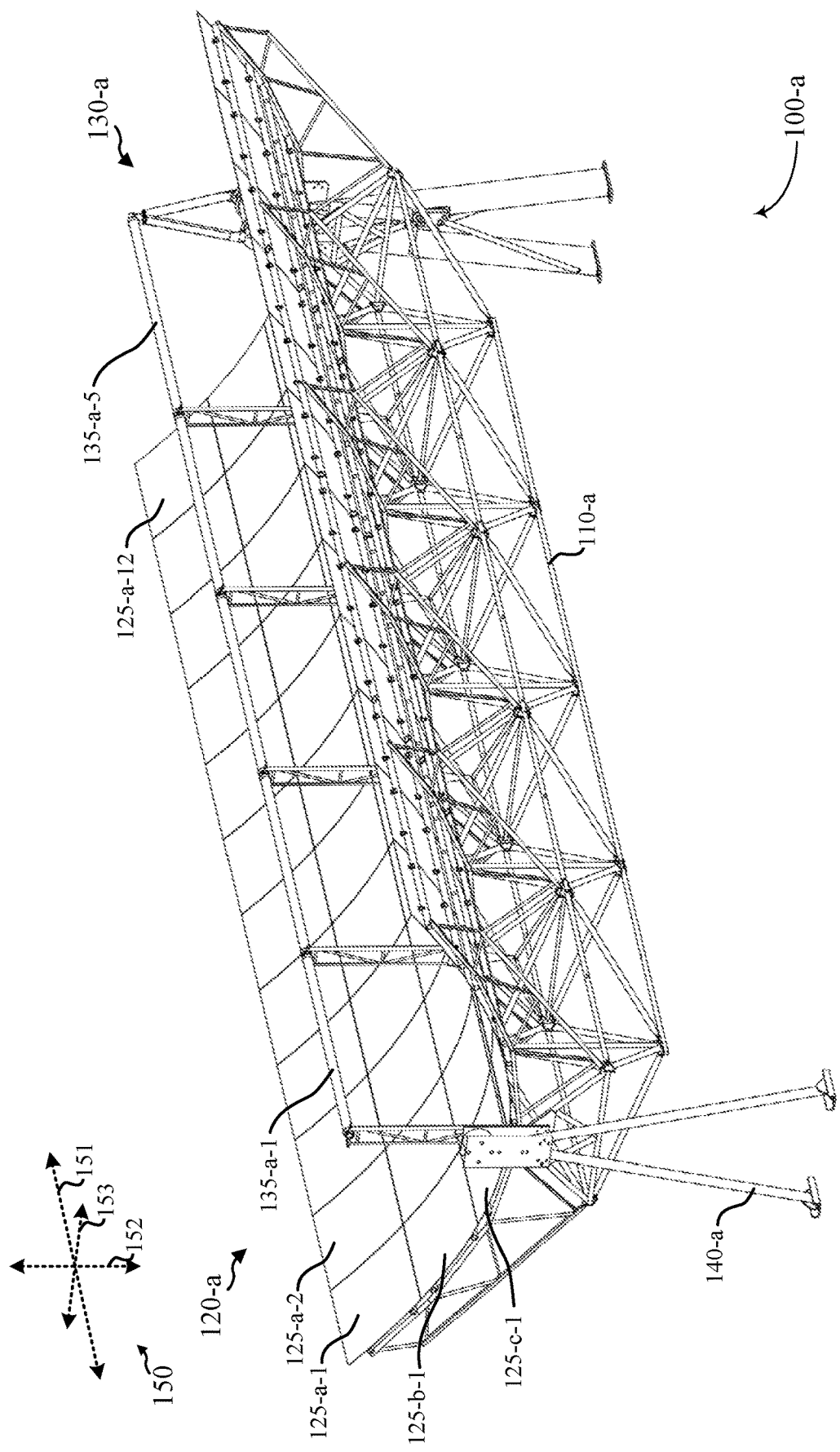
FIG. 11 illustrates an example of mirror segments and receiver segments that may be included in a solar collector assembly in accordance with aspects of the present disclosure.

FIG. 11 illustrates an example of mirror segments 125 and receiver segments 135 that may be included in a solar collector assembly 100-*a* (e.g., in the structural assembly 110-*a*) in accordance with aspects of the present disclosure. For example, the solar collector assembly 100-*a* may include a set of mirror segments 125-*a*-1 through 125-*c*-12 on the left side of the solar collector assembly 100-*a*, and a substantially repeating set of mirror segments 125 on the right side of the solar collector assembly 100-*a* that are not specifically identified by reference numeral, which may be included in a reflector assembly 120. The mirror segments 125 may be parabolic mirror facets in some examples, but other shapes such as flat mirror facets or mirror facets with other curvature may be used. In some examples, the mirror segments 125 may be connected to the mirror stringers 1010. The solar collector assembly 100-*a* may also include a set of receiver segments 135-*a*-1 through 135-*a*-5, which may be included in a receiver assembly 130-*a*. In some examples, the receiver segments 135 may be connected to the receiver support arms 810. The structural assembly 110-*a*, the reflector assembly 120-*a*, and the receiver assembly 130-*a* may be fixedly coupled to one another, and as a combined body, may be configured for rotation (e.g., relative to a pedestal assembly 140-*a*) about an axis that is parallel to a longitudinal axis (e.g., parallel to axis 205, coincident or non-coincident with the axis 205) for various pointing operations, such as maximizing solar energy capture.

Figure 12:
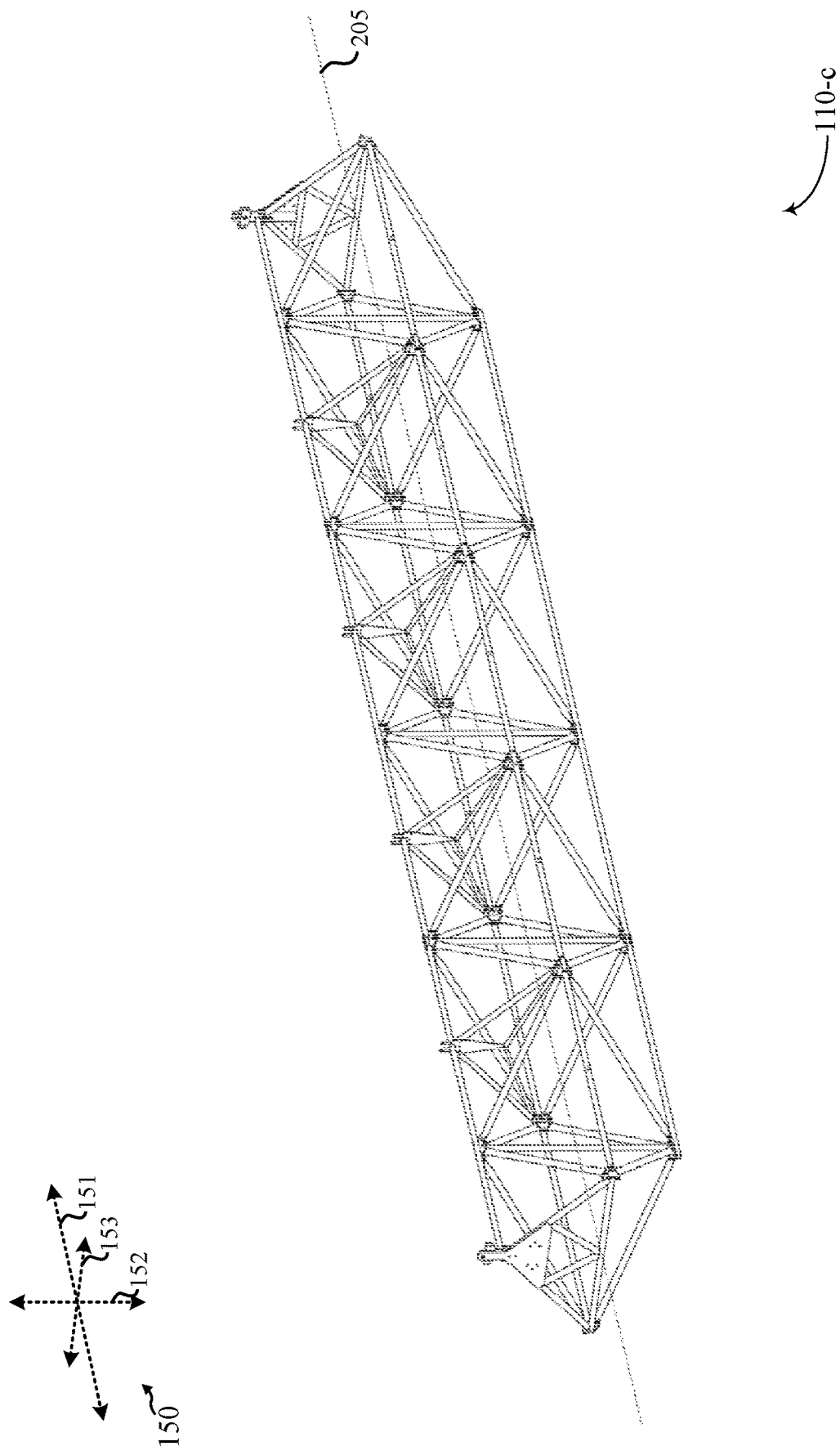
FIGS. 12 through 14 illustrate examples of solar collector assemblies in accordance with aspects of the present disclosure.

FIG. 12 illustrates an example of a solar collector assembly 100 (e.g., a structural assembly 110-*c*) in accordance with aspects of the present disclosure. The structural assembly 110-*c* illustrates an example of a solar collector assembly that omits lateral members 210-*b*. However, the structural assembly 110-*c* may include sets of helical structural paths 380 (e.g., a set of two or more co-rotating helical structural paths, two or more sets or pairs of counter-rotating helical structural paths 380), such as helical structural paths 380 that are similar to helical structural paths 380-*a*-1, 380-*a*-2, 380-*b*-1, and 380-*b*-2 described with reference to the structural assembly 110-*a* of FIG. 3D. Thus, the structural assembly 110-*c* may include helical structural paths 380 that share certain characteristics of helical structural paths 380 described with reference to structural assembly 110-*a*.

In the example of structural assembly 110-*c*, helical structural paths 380 may also be formed by diagonal members 310, and may combine to support particular characteristics. For example, the helical structural paths 380 of the structural assembly 110-*c* may illustrate an example of a solar collector assembly 100 (e.g., a structural assembly 110) having one or more sets of non-coincident or co-rotating helical structural paths 380 that are connected or coupled by structural members that are separate from the helical structural paths 380. In the example of structural assembly 110-*c*, co-rotating helical structural paths 380 may be coupled by structural members that are perpendicular to an axis (e.g., axis 205) of the helical structural paths 380 (e.g., radial members 210-*a* in the radial direction 152).

The structural assembly 110-*c* may also include receiver support bases 410, which may be similar to those described with reference to the structural assembly 110-*a*. Accordingly, the structural assembly 110-*c* may illustrate an example where receiver support bases 410 are connected between paired, co-rotating helical structural paths 380. In other words, the receiver support bases 410 of the structural assembly 110-c may take the place of, or otherwise accommodate or provide the functionality of the omitted lateral members 210-b.

Further, like the structural assembly 110-a, the structural assembly 110-c may illustrate an example having one or more sets of coincident or counter-rotating helical structural paths 380 (e.g., helical structural paths 380 rotating in opposite directions along the axis 205, a set comprising or consisting of a left-handed helical structural path 380 and a right-handed helical structural path 380) that include, emanate from, or terminate at a same structural node, and have common structural nodes or connections along their length. The receiver support bases 410 of the structural assembly 110-c may be connected between paired, counter-rotating helical structural paths 380, where, in some examples, the counter-rotating helical structural paths 380 of the structural assembly 110-c may share common nodes or connection points between the receiver support bases 410.

The structural assembly 110-c may also include longitudinal chords 610, which may be similar to those described with reference to the structural assembly 110-a. Like the structural assembly 110-a, the longitudinal chords 610 of the structural assembly 110-c may be configured to stabilize the structural assembly 110-c against bending loads and deflections. For example, where the helical structural paths 380 of the structural assembly 110-c may be configured primarily for reacting torsional loads (e.g., about the axis 205), the longitudinal chords 610 of the structural assembly 110-c may be configured primarily for reacting bending loads (e.g., about axes perpendicular to the axis 205). Thus, the combination of the longitudinal chords 610 and the helical structural paths 380 may illustrate an example of the structural assembly 110-c being configured to react or otherwise support varying loads about different axes.

The addition of the longitudinal chords 610 in the structural assembly 110-c is also an example of supporting non-coincident or co-rotating helical structural paths 380 in a direction parallel to an axis of the helical structural paths 380 (e.g., axis 205). For example, sets of co-rotating helical structural paths 380 in the structural assembly 110-c may be supported by the lengthwise longitudinal chords 610, which may each span the length (e.g., along the longitudinal direction) of the associated nodes. Thus, the structural assembly 110-c illustrates an example for providing sets (e.g., pairs) of coaxial helical structural paths 380 that co-rotate in the same direction along a longitudinal direction (e.g., either clockwise or counterclockwise), and are also supported by structural members (e.g., longitudinal chords 610, chord members 615) that are parallel with the longitudinal direction.

Although not illustrated, the structural assembly 110-c may include other components (e.g., to support a solar collector assembly 100 in combination with a reflector assembly 120 and a receiver assembly 130), such as chord braces 710, receiver support arms 810, mirror arms 910, or mirror stringers 1010, or various combinations thereof, where such components may be similar to, or different than those of the structural assemblies 110-a or 110-b described with reference to FIGS. 2 through 11.

Figure 13:
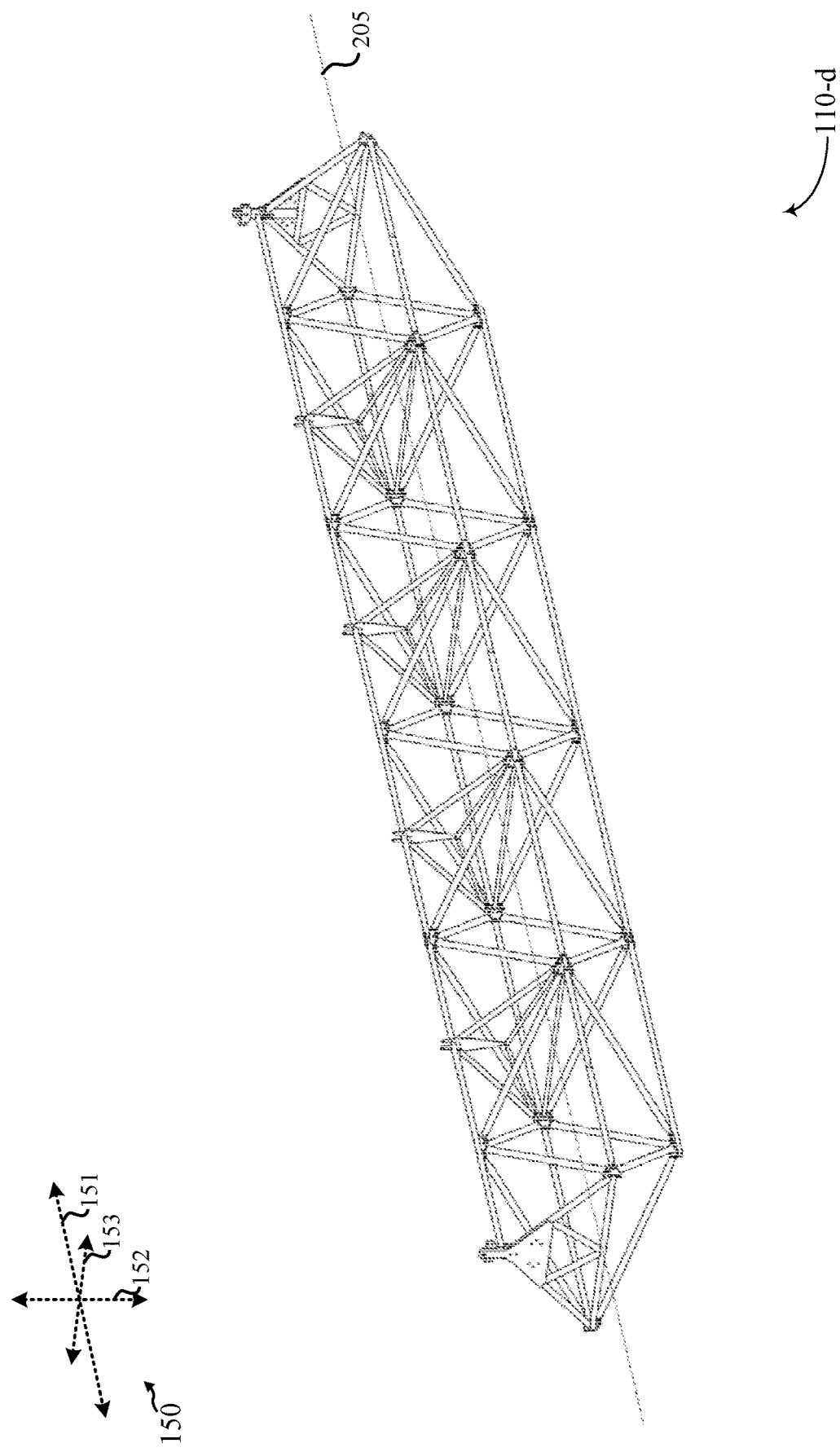

FIG. 13 illustrates an example of a solar collector assembly 100 (e.g., a structural assembly 110-d) in accordance with aspects of the present disclosure. The structural assembly 110-d illustrates an example of a solar collector assembly 100 that omits radial members 210-a. However, the structural assembly 110-d may include sets of helical structural paths 380 (e.g., a set of two or more co-rotating helical structural paths, two or more sets or pairs of counter-rotating helical structural paths 380), such as helical structural paths 380 that are similar to helical structural paths 380-a-1, 380-a-2, 380-b-1, and 380-b-2 described with reference to the structural assembly 110-a of FIG. 3D. Thus, the structural assembly 110-d may include helical structural paths 380 that share certain characteristics of helical structural paths 380 described with reference to structural assembly 110-a.

In the example of structural assembly 110-d, helical structural paths 380 may also be formed by diagonal members 310, and may combine to support particular characteristics. For example, the helical structural paths 380 of the structural assembly 110-d may illustrate an example of a solar collector assembly 100 (e.g., a structural assembly 110) having one or more sets of non-coincident or co-rotating helical structural paths 380 that are connected or coupled by structural members that are separate from the helical structural paths 380. In the example of structural assembly 110-c, co-rotating helical structural paths 380 may be coupled by structural members that are perpendicular to an axis (e.g., axis 205) of the helical structural paths 380 (e.g., lateral members 210-b in the transverse direction 153).

The structural assembly 110-d may also include receiver support bases 410, which may be similar to those described with reference to the structural assembly 110-a. Accordingly, the structural assembly 110-d may illustrate an example where receiver support bases 410 are connected between paired, co-rotating helical structural paths 380. In other words, the receiver support bases 410 of the structural assembly 110-d may combine with, or otherwise share the functionality of the lateral members 210-b in the structural assembly 110-d.

Further, like the structural assembly 110-a, the structural assembly 110-d may illustrate an example having one or more sets of coincident or counter-rotating helical structural paths 380 (e.g., helical structural paths 380 rotating in opposite directions along the axis 205, a set comprising or consisting of a left-handed helical structural path 380 and a right-handed helical structural path 380) that include, emanate from, or terminate at a same structural node, and have common structural nodes or connections along their length. The receiver support bases 410 of the structural assembly 110-d may be connected between paired, counter-rotating helical structural paths 380, where, in some examples, the counter-rotating helical structural paths 380 of the structural assembly 110-d may share common nodes or connection points between the receiver support bases 410.

The structural assembly 110-d may also include longitudinal chords 610, which may be similar to those described with reference to the structural assembly 110-a. Like the structural assembly 110-a, the longitudinal chords 610 of the structural assembly 110-d may be configured to stabilize the structural assembly 110-d against bending loads and deflections. For example, where the helical structural paths 380 of the structural assembly 110-d may be configured primarily for reacting torsional loads (e.g., about the axis 205), the longitudinal chords 610 of the structural assembly 110-d may be configured primarily for reacting bending loads (e.g., about axes perpendicular to the axis 205). Thus, the combination of the longitudinal chords 610 and the helical structural paths 380 may illustrate an example of the structural assembly 110-d being configured to react or otherwise support varying loads about different axes.

The addition of the longitudinal chords 610 in the structural assembly 110-d is also an example of supporting non-coincident or co-rotating helical structural paths 380 in a direction parallel to an axis of the helical structural paths 380 (e.g., axis 205). For example, sets of co-rotating helical structural paths 380 in the structural assembly 110-*d* may be supported by the lengthwise longitudinal chords 610, which may each span the length (e.g., along the longitudinal direction) of the associated nodes. Thus, the structural assembly 110-*d* illustrates an example for providing sets (e.g., pairs) of coaxial helical structural paths 380 that co-rotate in the same direction along a longitudinal direction (e.g., either clockwise or counterclockwise), and are also supported by structural members (e.g., longitudinal chords 610, chord members 615) that are parallel with the longitudinal direction.

Although not illustrated, the structural assembly 110-*d* may include other components (e.g., to support a solar collector assembly 100 in combination with a reflector assembly 120 and a receiver assembly 130), such as chord braces 710, receiver support arms 810, mirror arms 910, or mirror stringers 1010, or various combinations thereof, where such components may be similar to, or different than those of the structural assemblies 110-*a* or 110-*b* described with reference to FIGS. 2 through 11.

Figure 14:
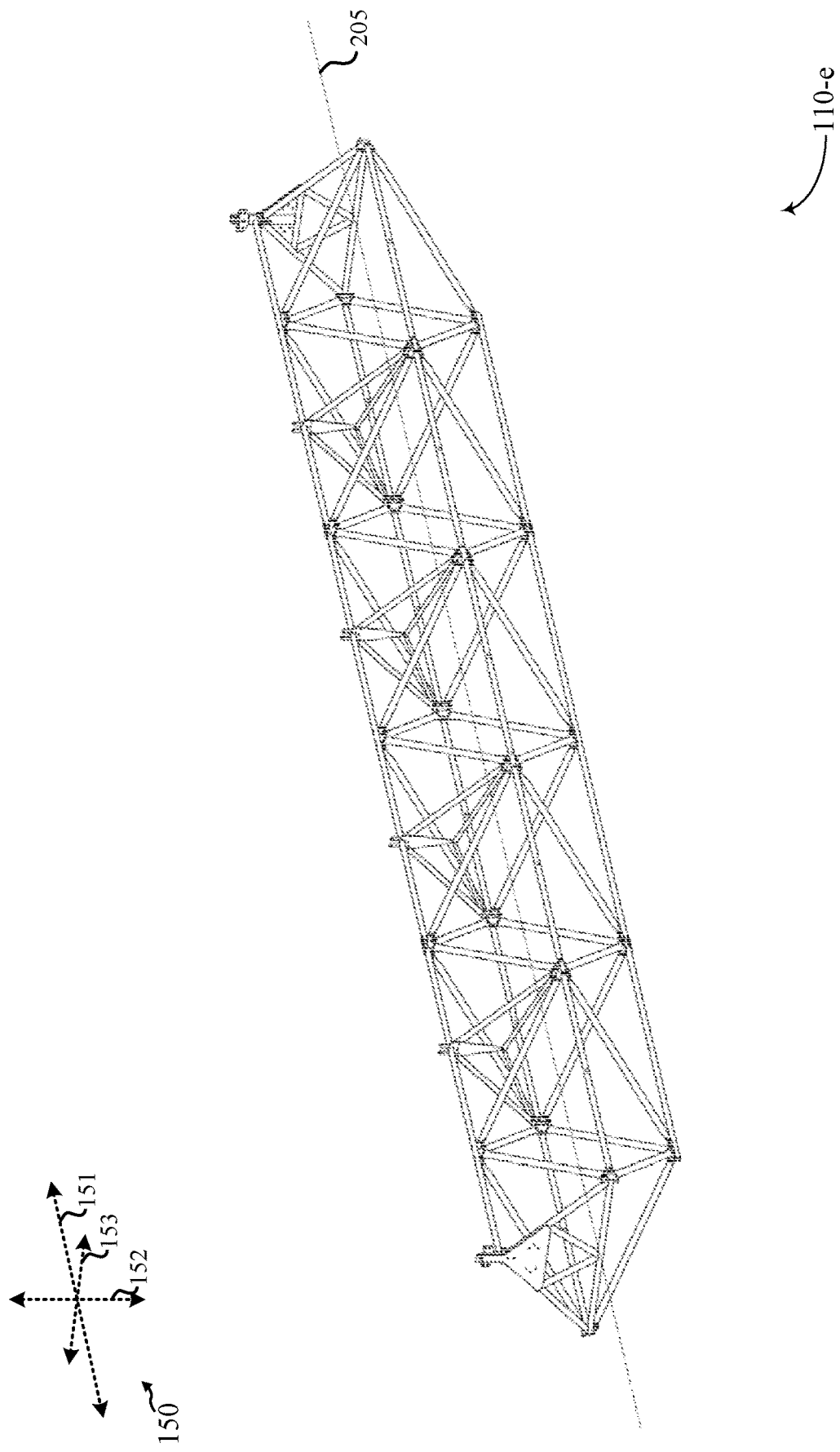

FIG. 14 illustrates an example of a solar collector assembly 100 (e.g., a structural assembly 110-*e*) in accordance with aspects of the present disclosure. The structural assembly 110-*e* illustrates an example of a solar collector assembly that omits axial members 210 (e.g., omits radial members 210-*a* and lateral members 210-*b*). However, the structural assembly 110-*e* may include sets of helical structural paths 380 (e.g., a set of two or more co-rotating helical structural paths, two or more sets or pairs of counter-rotating helical structural paths 380), such as helical structural paths 380 that are similar to helical structural paths 380-*a*-1, 380-*a*-2, 380-*b*-1, and 380-*b*-2 described with reference to the structural assembly 110-*a* of FIG. 3D. Thus, the structural assembly 110-*e* may include helical structural paths 380 that share certain characteristics of helical structural paths 380 described with reference to structural assembly 110-*a*.

In the example of structural assembly 110-*e*, helical structural paths 380 may also be formed by diagonal members 310, and may combine to support particular characteristics. For example, the helical structural paths 380 of the structural assembly 110-*d* may illustrate an example of a solar collector assembly 100 (e.g., a structural assembly 110) having one or more sets of non-coincident or co-rotating helical structural paths 380 that are connected or coupled by structural members that are separate from the helical structural paths 380. For example, the structural assembly 110-*e* may also include receiver support bases 410, which may be similar to those described with reference to the structural assembly 110-*a*. Accordingly, the structural assembly 110-*e* may illustrate an example where receiver support bases 410 are connected between paired, co-rotating helical structural paths 380.

Further, like the structural assembly 110-*a*, the structural assembly 110-*e* may illustrate an example having one or more sets of coincident or counter-rotating helical structural paths 380 (e.g., helical structural paths 380 rotating in opposite directions along the axis 205, a set comprising or consisting of a left-handed helical structural path 380 and a right-handed helical structural path 380) that include, emanate from, or terminate at a same structural node, and have common structural nodes or connections along their length. The receiver support bases 410 of the structural assembly 110-*e* may be connected between paired, counter-rotating helical structural paths 380, where, in some examples, the counter-rotating helical structural paths 380 of the structural assembly 110-*e* may share common nodes or connection points between the receiver support bases 410.

The structural assembly 110-*e* may also include longitudinal chords 610, which may be similar to those described with reference to the structural assembly 110-*a*. Like the structural assembly 110-*a*, the longitudinal chords 610 of the structural assembly 110-*e* may be configured to stabilize the structural assembly 110-*e* against bending loads and deflections. For example, where the helical structural paths 380 of the structural assembly 110-*e* may be configured primarily for reacting torsional loads (e.g., about the axis 205), the longitudinal chords 610 of the structural assembly 110-*e* may be configured primarily for reacting bending loads (e.g., about axes perpendicular to the axis 205). Thus, the combination of the longitudinal chords 610 and the helical structural paths 380 may illustrate an example of the structural assembly 110-*e* being configured to react or otherwise support varying loads about different axes.

The addition of the longitudinal chords 610 in the structural assembly 110-*e* is also an example of supporting non-coincident or co-rotating helical structural paths 380 in a direction parallel to an axis of the helical structural paths 380 (e.g., axis 205). For example, sets of co-rotating helical structural paths 380 in the structural assembly 110-*e* may be supported by the lengthwise longitudinal chords 610, which may each span the length (e.g., along the longitudinal direction) of the associated nodes. Thus, the structural assembly 110-*e* illustrates an example for providing sets (e.g., pairs) of coaxial helical structural paths 380 that co-rotate in the same direction along a longitudinal direction (e.g., either clockwise or counterclockwise), and are also supported by structural members (e.g., longitudinal chords 610, chord members 615) that are parallel with the longitudinal direction.

Although not illustrated, the structural assembly 110-*e* may include other components (e.g., to support a solar collector assembly 100 in combination with a reflector assembly 120 and a receiver assembly 130), such as chord braces 710, receiver support arms 810, mirror arms 910, or mirror stringers 1010, or various combinations thereof, where such components may be similar to, or different than those of the structural assemblies 110-*a* or 110-*b* described with reference to FIGS. 2 through 11.

Figure 15:
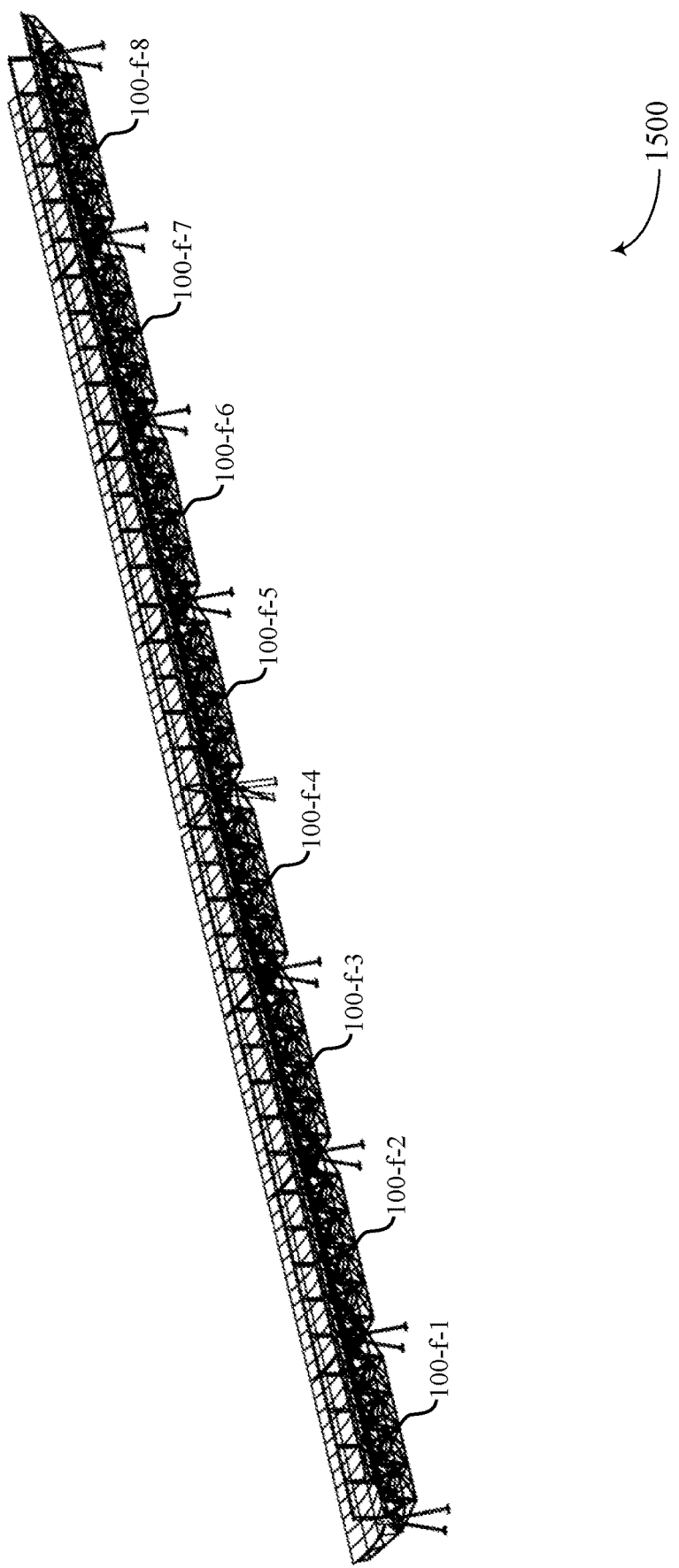
FIG. 15 illustrates an example of an interconnected set of solar collector assemblies in accordance with aspects of the present disclosure.

FIG. 15 illustrates an example of an interconnected set 1500 of solar collector assemblies 100 in accordance with aspects of the present disclosure. The example of the interconnected set 1500 includes eight solar collector assemblies 100 (e.g., solar collector assemblies 100-*f*-1 through 110-*f*-8), where adjacent solar collector assemblies 100 may be connected by an interconnection assembly or axle (e.g., not shown, connected between end trusses 510 of the adjacent solar collector assemblies 100). Other examples of an interconnected set 1500, or components thereof, may be configured may support configurations with more or fewer solar collector assemblies 100.

The interconnected set 1500 may be driven by a single, common actuator that aligns all of the solar collector assemblies 100-*f*-1 through 110-*f*-8 according to a direction of incident solar radiation. In some examples, such an actuator may be located near the middle of the interconnected set 1500, such as at a location between the solar collector assemblies 100-*f*-4 and 100-*f*-5. In other examples, such an actuator may be located at one end of the interconnected set 1500, such as at a left end of the solar collector assembly 100-*f*-1 or at a right end of the solar collector assembly 100-*f*-8, as illustrated. Other examples of interconnected sets 1500 may include a set of more than one actuator, which may include locations at ends of the respective interconnected set 1500, distributed along the longitudinal direction between solar collector assemblies 100 of the respective interconnected set 1500, and other configurations.

Under some loading scenarios, such as wind loading, distributed torsional loads or stresses may develop or accumulate along the longitudinal direction of the interconnected set 1500, and may result in torsional wind-up of the interconnected set 1500. Although the torsional loading itself may be relatively small at longitudinal ends of the interconnected set 1500, the accumulated torsional loading for the entire interconnected set 1500 may need to be reacted at, for example, a central actuator that controls the positioning or holds an alignment of the interconnected set 1500. Thus, torsional loading may be highest at a central actuator or other mechanism that is holding a rotational positioning of the interconnected set 1500, and may be in the range of hundreds of thousands of Newton-meters in some examples of an interconnected set 1500.

Torsional deflections, on the other hand, may be highest at the longitudinal ends of the interconnected set 1500, due to the accumulation of deflections from a central actuator or other mechanism holding the interconnected set 1500 in a rotational direction (e.g., about a longitudinal axis). Because optical efficiency of the interconnected set 1500 may be related to the accuracy of alignment of each of the solar collector assemblies 100 (e.g., an alignment of a radial direction of each of the solar collector assemblies 100 according to a direction of incident solar radiation), deflections of each of the solar collector assemblies 100 (e.g., torsional deflections, bending deflections, deflections between a receiver assembly 130 and a reflector assembly 120), or both, structural stiffness or rigidity of each of the solar collector assemblies 100 may be relevant to the performance not only of an individual solar collector assembly 100, but also to an interconnected set 1500 as a whole. The techniques described herein, such as the described collection of tetrahedral shapes or volumes of a structural assembly 110 (e.g., tetrahedra 370, tetrahedra 630, tetrahedra 640), or the described collection of co-rotating and counter-rotating helical structural paths (e.g., helical structural paths 380), may be beneficial for providing such structural stiffness or rigidity for an interconnected set 1500, while also supporting relatively low costs or complexity.

Figure 16:
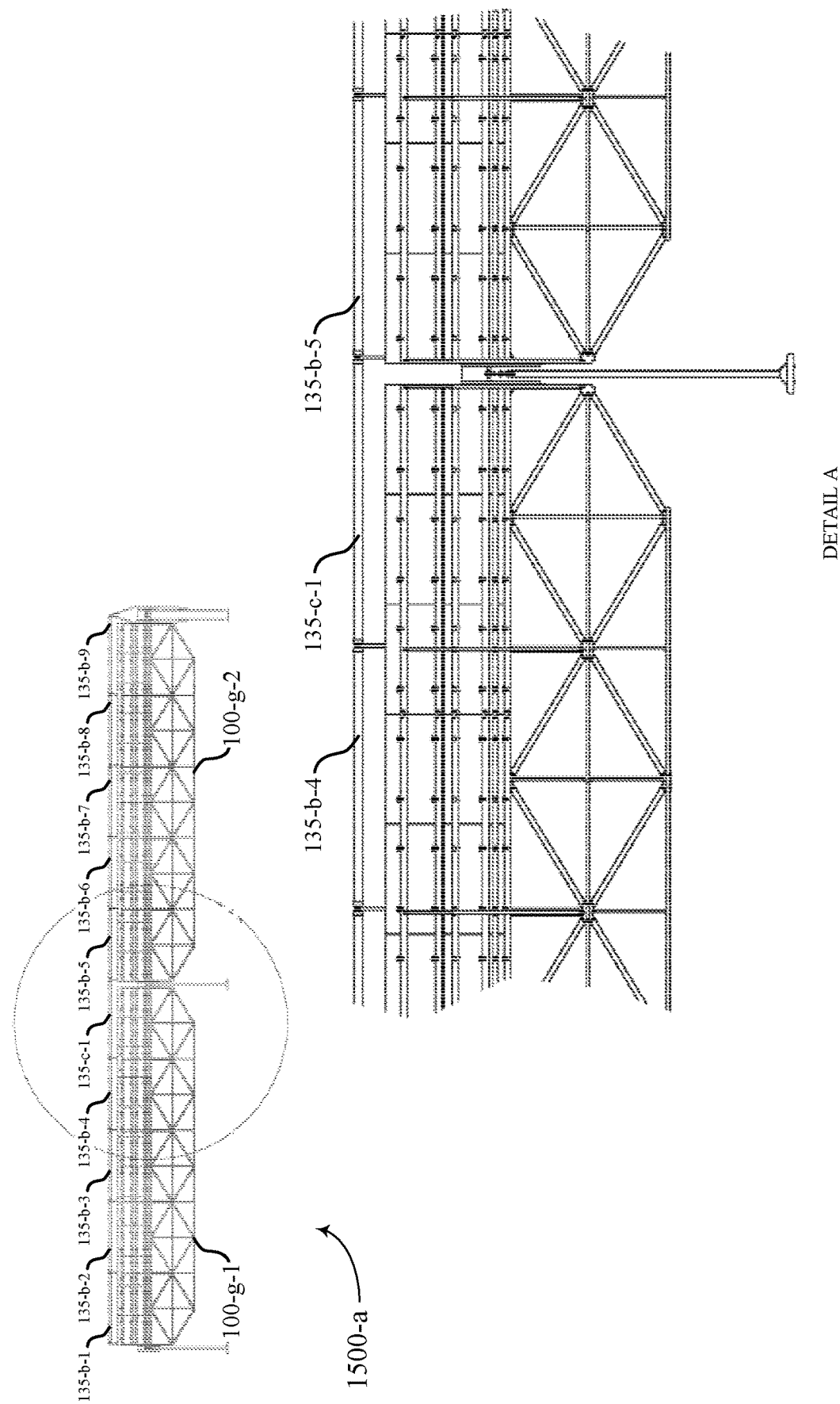
FIG. 16 illustrates an example of an interconnected set of solar collector assemblies, and interfacing receiver segments, in accordance with aspects of the present disclosure.

FIG. 16 illustrates an interconnected set 1500-a of solar collector assemblies 100, and interfacing receiver segments 135, in accordance with aspects of the present disclosure. The example of the interconnected set 1500-a includes two solar collector assemblies 100 (e.g., solar collector assemblies 100-g-1 and 100-g-2), where the receiver assemblies 130 of adjacent solar collector assemblies 100 may be interconnected by a receiver segment 135 having a different length than other receiver segments 135. For example, the solar collector assembly 100-g-2 may include five receiver segments 135-b having the same length (e.g., receiver segments 135-b-5 through 135-b-9), and the solar collector assembly 100-g-1 may include four receiver segments 135-b having that same length (e.g., receiver segments 135-b-1 through 135-b-4) and a fifth receiver segment 135-c-1 having a longer length, configured to additionally span a gap between the solar collector assembly 100-g-1 and the solar collector assembly 100-g-2. Thus, by including a longer receiver segment 135-c, the structures of the solar collector assemblies 100-g (e.g., components of corresponding structural assemblies 110) may be substantially repeating or symmetric (e.g., along a longitudinal direction, avoiding a reconfiguration of components at ends of the solar collector assemblies 100-g), and the interconnected set 1500-a may avoid a separate interconnection component (e.g., between a receiver assembly 130 of the solar collector assembly 100-g-1 and a receiver assembly 130 of the solar collector assembly 100-g-2) and associated seals or other interfaces. Although illustrated by a single interface between solar collector assemblies 100, the described techniques of including a longer receiver segment 135 between solar collector assemblies 100 may be repeated in interconnected sets 1500 having more than two solar collector assemblies 100.

The description set forth herein, in connection with the appended drawings, describes example configurations and does not represent all the examples that may be implemented or that are within the scope of the claims. The terms "example" or "exemplary" used herein mean "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

The foregoing description and claims may refer to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled with another element/feature.

As used herein, unless expressly stated otherwise, "rotatably coupled" refers to a coupling between objects which have a positional constraint between them at a coupling location, and have at least one rotational degree of freedom between them, where the at least one rotational degree of freedom is about at least one axis that passes through the coupling location. For instance, objects may be rotatably coupled by any of a ball bearing, a roller bearing, a journal bearing, a bushing, a spherical bearing, a ball and socket joint, and the like. A description of objects being "rotatably coupled" does not preclude a linear degree of freedom between the objects. For instance, rotatably coupled objects may be coupled by a cylindrical journal bearing that provides a rotational degree of freedom about the axis of the cylinder, as well as a linear degree of freedom along the axis of the cylinder. In such an example, the positional constraint between the objects would be in a radial direction from the axis of the cylinder.

As used herein, unless expressly stated otherwise, "fixedly coupled" refers a coupling between objects which have neither a linear degree of freedom nor a rotational degree of freedom between them. For instance, objects may be fixedly coupled by any one or more of a screw, a bolt, a clamp, a magnet, or by a process such as welding, brazing, soldering, gluing, fusing, and the like. A description of objects being "fixedly coupled" does not entirely preclude movement between the objects. For instance, objects that are fixedly coupled may have looseness or wear at a location of coupling which permits some degree of movement between objects. Further, objects that are fixedly coupled may experience a degree of movement between them as a result of compliance within or between the objects. In addition, two objects that are fixedly coupled may not be in direct contact, and may instead have other components that are fixedly coupled between the two objects.

Thus, although the various schematics shown in the Figures depict example arrangements of elements and components, additional intervening elements, devices, features, or components may be present in an actual embodiment (assuming that the functionality of the depicted structures are not adversely affected).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A structural assembly for a solar collector, comprising:
   a first set of members distributed along an axis, wherein, along a direction of the axis, members of the first set alternate between being aligned in a first direction that is parallel to a direction between the axis and a receiver of the solar collector and being aligned in a second direction that is perpendicular to the direction between the axis and the receiver of the solar collector;
   a second set of members connected between adjacent members of the first set such that the first set of members and the second set of members collectively define a set of edge-sharing tetrahedra along the axis, wherein adjacent pairs of the set of edge-sharing tetrahedra share one of the first set of members,
   wherein each member of the first set that is aligned in the first direction is connected with an adjacent member of the first set that is aligned in the first direction by at least two longitudinal chords that are parallel with the axis; and
   a plurality of receiver support structures,
   wherein each receiver support structure in the plurality of receiver support structures includes a receiver support base,
   wherein each of the plurality of receiver support structures is connected with a respective one of the first set of members that is aligned in the second direction at a first end of the respective one of the first set of members that is aligned in the second direction and at a second end of the respective one of the first set of members that is aligned in the second direction, and
   wherein the receiver support base of each of the receiver support structures extends between the first end of the respective one of the first set of members that is aligned in the second direction and the second end of the respective one of the first set of members that is aligned in the second direction.

2. The structural assembly of claim 1, further comprising:
   a respective node connector connected to each end of each member of the first set of members, wherein the respective node connector provides a connection point for the respective end of the respective member of the first set of members and an end of each member of the second set of members that is connected between the respective member of the first set of members and an adjacent member of the first set of members.

3. The structural assembly of claim 1, further comprising:
   a solar energy receiver connected to each of the plurality of receiver support structures.

4. The structural assembly of claim 1, further comprising:
   a plurality of reflector support structures, each of the plurality of reflector support structures connected with one of the first set of members that is aligned in the second direction and the one of the set of receiver support structures that is connected with the one of the first set of members that is aligned in the second direction.

5. The structural assembly of claim 4, further comprising:
   a plurality of mirror stringers parallel to the axis and connected to the plurality of reflector support structures.

6. The structural assembly of claim 5, further comprising:
   a plurality of parabolic mirror segments connected to the plurality of mirror stringers and configured to focus incident solar energy along a focal axis.

7. The structural assembly of claim 1, further comprising:
   a plurality of chord braces, each of the plurality of chord braces connected with one of the at least two longitudinal chords and a respective one of the first set of members that is aligned in the second direction.

8. The structural assembly of claim 1, wherein each member of the first set that is aligned in the second direction is connected with an adjacent member of the first set that is aligned in the second direction by a first longitudinal chord that is parallel with the axis and a second longitudinal chord that is parallel with the axis.

9. The structural assembly of claim 8, further comprising:
   a first plurality of chord braces, each of the first plurality of chord braces connected with the first longitudinal chord and a respective one of the first set of members that is aligned in the first direction; and
   a second plurality of chord braces, each of the second plurality of chord braces connected with the second longitudinal chord and a respective one of the first set of members that is aligned in the first direction.

10. A system, comprising:
    a reflector assembly;
    a solar energy receiver;
    a frame structure connected with the reflector and the solar energy receiver and comprising a plurality of tetrahedra defined by members of the frame structure and distributed along a longitudinal axis that is parallel to the solar energy receiver, wherein:
    each tetrahedron of the plurality includes a respective first member that is coincident with the longitudinal axis, wherein the respective first member is perpendicular to the longitudinal axis and parallel to a direction between the longitudinal axis and the solar energy receiver;
    each tetrahedron of the plurality includes a respective second member that is coincident with the longitudinal axis, wherein the respective second member is perpendicular to the longitudinal axis and perpendicular to a direction between the longitudinal axis and the solar energy receiver;

each of the respective first members is connected with an adjacent first member at a first end by a first chord member of the frame structure;

each of the respective first members is connected with an adjacent first member at a second end by a second chord member of the frame structure;

each of the respective second members is connected with an adjacent second member at a first end by a third chord member of the frame structure; and each of the respective second members is coupled with an adjacent second member at a second end by a fourth chord member of the frame structure; and a plurality of receiver support structures, wherein each of the receiver support structures is connected with a respective one of the second members at the first end of the respective one of the second members and at the second end of the respective one of the second members.

11. The system of claim 10, wherein the frame structure further comprises:

a plurality of mirror support structures, each of the mirror support structures connected with one of the plurality of receiver support structures and the reflector assembly.

12. A system, comprising:

a reflector assembly;

a solar energy receiver; and a frame structure connected with the reflector assembly and the solar energy receiver, the frame structure comprising:

a first plurality of structural members, wherein each of the first plurality of structural members is non-parallel with a longitudinal axis of the frame structure, and wherein the first plurality of structural members forms a set of co-rotating helical structural paths between longitudinal ends of the frame structure and a set of counter-rotating helical structural paths between the longitudinal ends of the frame structure;

a second plurality of structural members, wherein each of the second plurality of structural members is perpendicular with the longitudinal axis of the frame structure, wherein each of the second plurality of structural members provides a structural coupling between at least two helical structural paths of the set of co-rotating helical structural paths, wherein members of the second plurality of structural members alternate between being aligned in a first direction that is parallel to a direction between the longitudinal axis of the frame structure and the solar energy receiver and being aligned in a second direction that is perpendicular to the direction between the longitudinal axis of the frame structure and the solar energy receiver; and a plurality of receiver support structures, wherein each of the receiver support structures is connected with a first end of a respective one of the second plurality of structural members that is aligned in the second direction and a second end of the respective one of the second plurality of structural members that is aligned in the second direction.

13. The system of claim 12, wherein each of the receiver support structures is connected between two helical structural paths of the set of co-rotating helical structural paths.

14. The system of claim 13, wherein the frame structure further comprises:

a plurality of reflector support structures, wherein each of the reflector support structures is connected between one of the two helical structural paths and one of the plurality of receiver support structures.

15. The system of claim 14, wherein each of the plurality of reflector support structures is connected to the respective one of the two helical structural paths as at the respective one of the plurality of receiver support structures at a same node of the structural assembly.

16. The system of claim 12, further comprising:

a plurality of node connectors, wherein each of the receiver support structures is connected with the first and second ends of the respective one of the second plurality of structural members that is aligned in the second direction by respective first and second ones of the node connectors.

17. The structural assembly of claim 2, wherein the receiver support base of each of the plurality of receiver support structures is connected with a respective one of the first set of members that is aligned in the second direction at a first end of the respective one of the first set of members and at a second end of the respective one of the first set of members that is aligned in the second direction by respective first and second ones of the node connectors.

18. The system of claim 10, further comprising:

a plurality of node connectors, wherein each of the plurality of receiver support structures is connected to the first and second ends of a respective one of the second members by respective first and second ones of the node connectors.

* * * * *